(12) United States Patent
Yamauchi et al.

(10) Patent No.: US 11,381,085 B2
(45) Date of Patent: Jul. 5, 2022

(54) OPERATIONAL SUPPORT DEVICE FOR POWER GENERATION FACILITY

(71) Applicant: MITSUBISHI HEAVY INDUSTRIES, LTD., Tokyo (JP)

(72) Inventors: Hisaki Yamauchi, Tokyo (JP);
Nobuyoshi Tanaka, Tokyo (JP);
Kentaro Shikata, Tokyo (JP);
Toshihiko Toyota, Kanagawa (JP);
Shogo Ichishiba, Kanagawa (JP);
Prabhakar Sachan, Kanagawa (JP);
Takahiro Yamauchi, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 160 days.

(21) Appl. No.: 16/832,119

(22) Filed: Mar. 27, 2020

(65) Prior Publication Data
US 2020/0313435 A1    Oct. 1, 2020

(30) Foreign Application Priority Data

Mar. 28, 2019    (JP) .............................. JP2019-064620

(51) Int. Cl.
*H02J 3/16* (2006.01)
*H02J 3/00* (2006.01)
(Continued)

(52) U.S. Cl.
CPC ................ *H02J 3/16* (2013.01); *F01D 21/14* (2013.01); *G05B 19/0428* (2013.01);
(Continued)

(58) Field of Classification Search
CPC ... H02J 3/16; H02J 3/004; H02J 3/003; G05B 19/0428; G06Q 30/0206; G06Q 10/06315;
(Continued)

(56) References Cited

U.S. PATENT DOCUMENTS

2011/0061575 A1 *   3/2011   Seeker .................... F23N 5/022
                                                                  110/189
2011/0282500 A1    11/2011   Long et al.
(Continued)

FOREIGN PATENT DOCUMENTS

JP        56-83526       7/1981
JP        2005-25377     1/2005
(Continued)

OTHER PUBLICATIONS

Notice of Reasons for Refusal dated Jan. 26, 2021 in corresponding Japanese Patent Application No. 2020-052431, with English Translation.

(Continued)

*Primary Examiner* — Ziaul Karim
(74) *Attorney, Agent, or Firm* — Wenderoth, Lind & Ponack, L.L.P.

(57) ABSTRACT

An operational support device sets an execution time of overfiring serving as an operation of a power generation facility at an output higher than a rated output. The device includes a life index value acquisition unit that acquires a life index value at a start time, the life index value being an index indicating a life of the power generation facility and changing in value in one direction with the output of the power generation facility; an output pattern setting unit that sets an output pattern per unit time of the power generation facility from the start time to a stop time based on the life index value such that the life index value reaches a predetermined value; and an overfiring setting unit that sets, based on the output pattern, a time in a period from the start to the stop time at which the overfiring is to be performed.

14 Claims, 15 Drawing Sheets

(51) Int. Cl.
*G05B 19/042* (2006.01)
*G06Q 30/02* (2012.01)
*G06Q 10/06* (2012.01)
*F01D 21/14* (2006.01)
*G06Q 50/06* (2012.01)

(52) U.S. Cl.
CPC ... *G06Q 10/06315* (2013.01); *G06Q 30/0206* (2013.01); *H02J 3/003* (2020.01); *H02J 3/004* (2020.01); *G06Q 50/06* (2013.01)

(58) Field of Classification Search
CPC ......... G06Q 50/06; F01D 21/14; F01D 21/12; Y04S 50/14; F05D 2270/303; F05D 2270/11; F05D 2270/05; F05D 2270/053; F05D 2260/80; F05D 2260/83; F05D 2270/112; F02C 9/28
See application file for complete search history.

(56) References Cited

U.S. PATENT DOCUMENTS

| | | | | |
|---|---|---|---|---|
| 2012/0069131 | A1* | 3/2012 | Abelow | G06Q 30/02 345/589 |
| 2013/0127164 | A1* | 5/2013 | Pena | G05F 1/10 290/2 |
| 2015/0184550 | A1* | 7/2015 | Wichmann | G05B 13/04 700/287 |
| 2015/0185716 | A1* | 7/2015 | Wichmann | F02C 9/28 700/287 |
| 2016/0086108 | A1* | 3/2016 | Abelow | G06Q 30/02 705/7.29 |
| 2016/0281607 | A1* | 9/2016 | Asati | F02C 7/26 |
| 2017/0364043 | A1* | 12/2017 | Ganti | G05B 17/02 |
| 2018/0284707 | A1* | 10/2018 | Menon | F02C 9/28 |
| 2019/0018380 | A1 | 1/2019 | Tomita et al. | |
| 2019/0018384 | A1 | 1/2019 | Tomita et al. | |

FOREIGN PATENT DOCUMENTS

| | | |
|---|---|---|
| JP | 2011-241828 | 12/2011 |
| JP | 2014-150682 | 8/2014 |
| JP | 5973096 | 8/2016 |
| JP | 6062581 | 1/2017 |
| JP | 2017-125776 | 7/2017 |

OTHER PUBLICATIONS

Notice of Reasons for Refusal dated Jan. 26, 2021 in corresponding Japanese Patent Application No. 2020-052430, with English Translation.

* cited by examiner

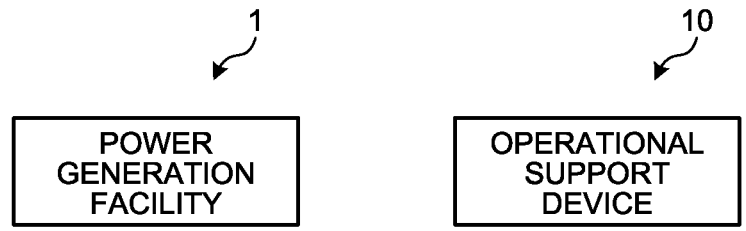
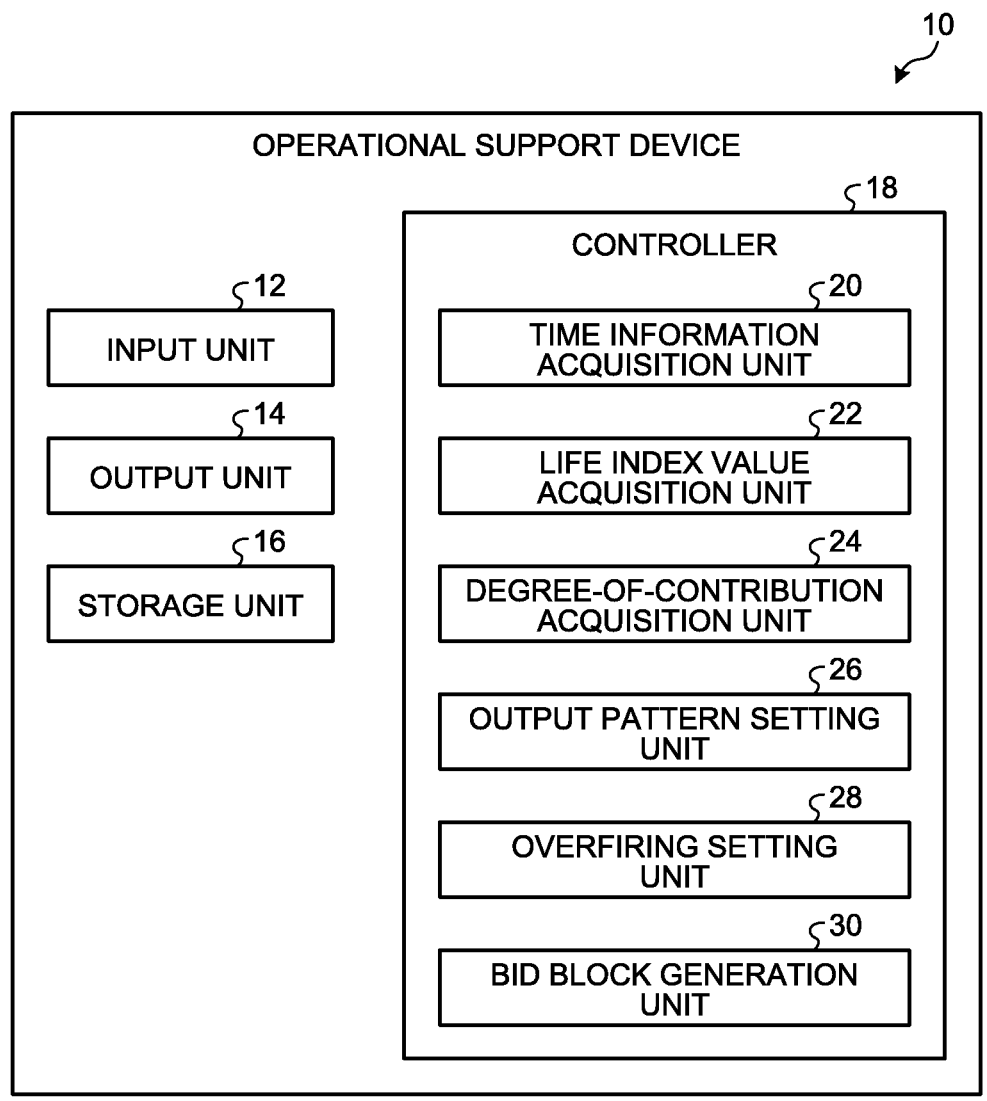

FIG.12
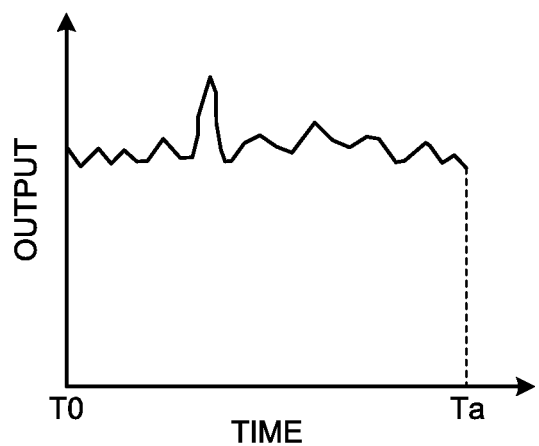
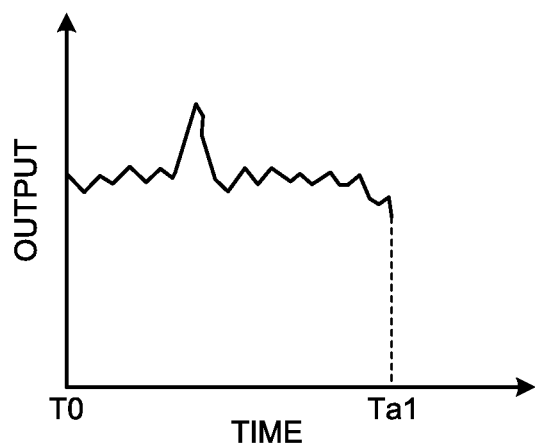
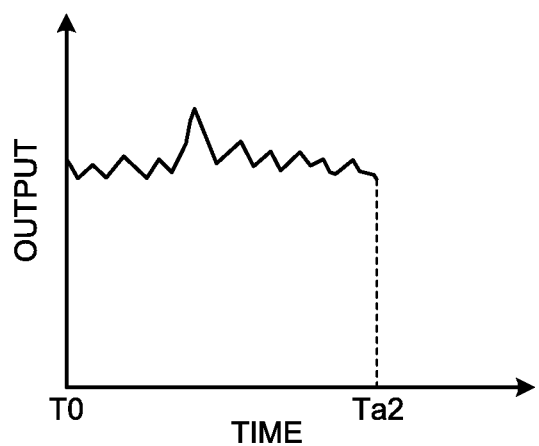

FIG.13
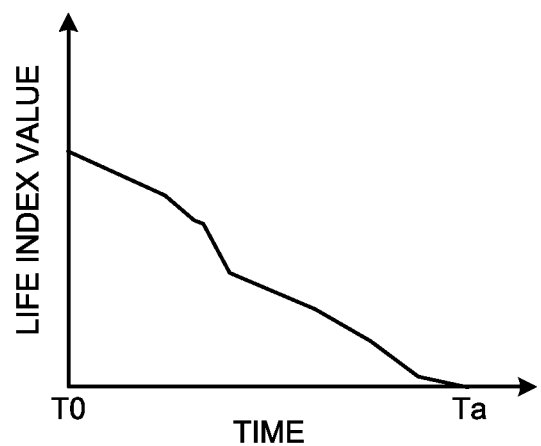
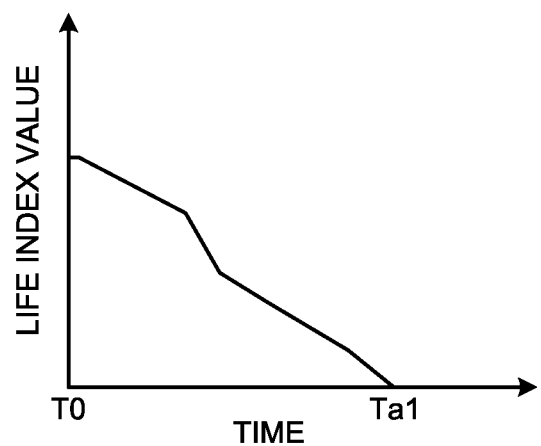
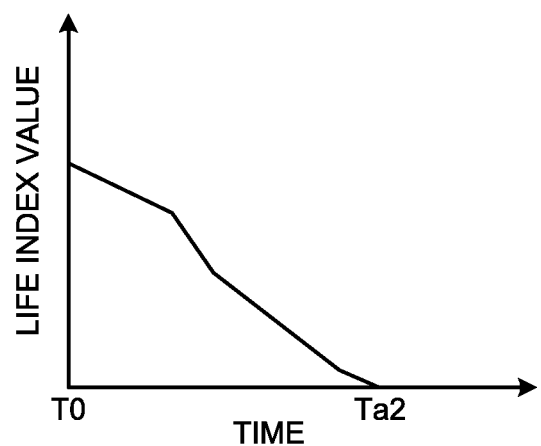

OPERATIONAL SUPPORT DEVICE FOR POWER GENERATION FACILITY

CROSS-REFERENCE TO RELATED APPLICATIONS

The present application claims priority to and incorporates by reference the entire contents of Japanese Patent Application No. 2019-064620 filed in Japan on Mar. 28, 2019.

FIELD

The present invention relates to an operational support device for a power generation facility.

BACKGROUND

A power generation facility, such as a gas turbine, is generally operated so as to keep an operational efficiency optimal and reduce power generating cost. For example, Japanese Patent No. 6062581 describes that an operable time in an overfiring operation is calculated based on a life of a turbine.

However, there is still room for improvement to appropriately operate the power generation facility.

In order to solve the above-described problem, it is an object of the present invention to provide an operational support device for a power generation facility that supports an appropriate operation of the power generation facility.

SUMMARY OF THE INVENTION

To solve the problem described above and achieve the object, an operational support device for a power generation facility according to the present disclosure is for setting an execution time of overfiring serving as an operation of the power generation facility at an output higher than a rated output. The operational support device includes a life index value acquisition unit configured to acquire either a life index value at a start time serving as a predetermined time after a current time and a life consumption value representing an amount of change in the life index value per unit time, or the life index value at the start time and a relation between the life consumption value and an output of the power generation facility, the life index value being an index indicating a life of the power generation facility and changing in value in one direction with the output of the power generation facility; an output pattern setting unit configured to set, based on either the life index value at the start time and life consumption value or the life index value at the start time and the relation, an output pattern per unit time of the power generation facility from the start time to a stop time after the start time such that the life index value reaches a predetermined value set in advance at the stop time, while allowing the overfiring; and an overfiring setting unit configured to set, based on the output pattern, a time in a period from the start time to the stop time at which the overfiring is to be performed.

It is preferable that the operational support device further includes a degree-of-contribution acquisition unit configured to acquire a degree of contribution to a stable supply of electricity assigned to an amount of electricity supply per unit time in each unit time during the period from the start time to the stop time, and the output pattern setting unit is configured to set, based on the life index value at the start time and the degree of contribution during the period from the start time to the stop time, the output pattern per unit time of the power generation facility during the period from the start time to the stop time such that the life index value reaches the predetermined value set in advance at the stop time, and an evaluation value based on the degree of contribution and the amount of electricity supply per unit time during the period from the start time to the stop time is maximized.

It is preferable that the degree-of-contribution acquisition unit is configured to acquire a price of electricity set per unit time as the degree of contribution, and the output pattern setting unit is configured to treat a revenue obtained by power generation of the power generation facility as the evaluation value.

It is preferable that the output pattern setting unit is configured to set the output pattern so as to increase the output of the power generation facility at a time when the degree of contribution is higher.

It is preferable that the operational support device further includes a bid block generation unit configured to generate, based on the output pattern, bid blocks each indicating a price for each output per unit time of electricity supplied by the power generation facility.

It is preferable that the bid block generation unit is configured to generate, based on an output efficiency of the power generation facility, rated bid blocks each indicating the price for each output of the supplied electricity up to the rated output, and generate, based on the output of the power generation facility set by the output pattern, high-output bid blocks each indicating the price for each output of the supplied electricity when the overfiring is performed.

To solve the problem described above and achieve the object, an operational support device for a power generation facility according to the present disclosure is for setting a stop time to stop operating the power generation facility. The operational support device includes a candidate stop time setting unit configured to set a candidate stop time serving as a candidate for the stop time; a life index value acquisition unit configured to acquire a value of a life index value at a start time serving as a predetermined time after a current time, the life index value being an index indicating a life of the power generation facility and changing in value in one direction with the output of the power generation facility; a degree-of-contribution acquisition unit configured to acquire a degree of contribution to a stable supply of electricity assigned to an amount of electricity supply per unit time in each unit time during a period from the start time to the candidate stop time; an output pattern setting unit configured to set, based on the life index value at the start time and the degree of contribution during the period from the start time to the candidate stop time, an output pattern per unit time of the power generation facility during the period from the start time to the candidate stop time such that the life index value reaches a predetermined value set in advance at the candidate stop time, and an evaluation value based on the degree of contribution and the amount of electricity supply per unit time during the period from the start time to the candidate stop time is maximized; and a stop time setting unit configured to set the stop time based on the output pattern.

It is preferable that the candidate stop time setting unit is configured to set a plurality of the candidate stop times, the output pattern setting unit is configured to set the output pattern with respect to each of the candidate stop times, and the stop time setting unit is configured to set the stop time from among the candidate stop times based on the output patterns with respect to the respective candidate stop times.

It is preferable that the stop time setting unit is configured to compare revenues that are not obtained because the power generation facility is stopped at the respective candidate stop times and revenues obtained by operating the power generation facility from the start time to the respective candidate stop times among the candidate stop times, and set the stop time from among the candidate stop times based on the results of the comparison.

It is preferable that the output pattern setting unit is configured to set the output pattern with respect to a first candidate stop time serving as one of the candidate stop times, and the stop time setting unit is configured to set, based on the output pattern with respect to the first candidate stop time, the stop time from among the first candidate stop time and a second candidate stop time serving as a candidate for the stop time other than the first candidate stop time.

It is preferable that the stop time setting unit is configured to compare a revenue that is not obtained because the power generation facility is stopped at the first candidate stop time, a revenue obtained by operating the power generation facility from the start time to the first candidate stop time, and the life index value at the first candidate stop time, with a revenue that is not obtained because the power generation facility is stopped at the second candidate stop time, a revenue obtained by operating the power generation facility from the start time to the second candidate stop time, and the life index value at the second candidate stop time, respectively, and set the stop time from among the first candidate stop time and the second candidate stop time based on the results of the comparison.

It is preferable that the output pattern setting unit is configured to set the output pattern such that overfiring serving as an operation of the power generation facility at an output higher than a rated output is performed during a period from the start time to the candidate stop time.

To solve the problem described above and achieve the object, an operational support device for a power generation facility according to the present disclosure is for setting an output of the power generation facility at a predetermined time after a current time. The operational support device includes an external environment acquisition unit configured to acquire an external environmental condition value representing a predicted condition of an external environment of the power generation facility at the predetermined time; and an output value setting unit configured to set a maximum output setting value serving as a maximum value of an output of the power generation facility based on the external environmental condition value.

It is preferable that the external environment acquisition unit is configured to acquire a plurality of the external environmental condition values that vary with a probability distribution, and the output value setting unit is configured to set the maximum value of the output of the power generation facility to a value lower than the highest of the maximum output setting values calculated based on the respective external environmental condition values.

It is preferable that the power generation facility is capable of performing an overfiring operation serving as an operation at an output higher than a rated output, the operational support device further comprises a difference value acquisition unit configured to acquire a difference value between the rated output and an overfiring output serving as the maximum value of the output in the overfiring operation, the external environment acquisition unit is configured to acquire a plurality of the external environmental condition values that vary with a probability distribution, and the output value setting unit is configured to calculate the rated output for each of the external environmental condition values as the maximum output setting value, and set the maximum value of the output of the power generation facility to a value obtained by adding the difference value to the lowest of the maximum output setting values for the respective external environmental condition values.

It is preferable that the operational support device further includes a life index value acquisition unit configured to acquire a value of a life index value at the predetermined time, the life index value being an index indicating a life of the power generation facility and changing in value in one direction with the output of the power generation facility; and a notification controller configured to cause a notification to be made to recommend to employ the maximum output setting value set by the output value setting unit when the life index value at the predetermined time is equal to or higher than a predetermined value.

It is preferable that the operational support device further includes a notification controller configured to cause a notification to be made to recommend to employ the maximum output setting value set by the output value setting unit when a predicted value of a price of electricity at the predetermined time is equal to or higher than a predetermined price.

It is preferable that the operational support device further includes a bid block setting unit configured to set a bid block indicating a price for each output of electricity supplied by the power generation facility, and the bid block setting unit is configured to set the maximum value of the output of the power generation facility for the bid block based on the maximum output setting value so as to set the bid block at the predetermined time.

It is preferable that the external environmental condition value is at least one of atmospheric temperature, humidity, and atmospheric pressure.

Advantageous Effects of Invention

The present invention can provide a support for an appropriate operation of a power generation facility.

BRIEF DESCRIPTION OF DRAWINGS

FIG. 1 is a schematic block diagram of an operational support device according to a first embodiment of the present invention.

FIG. 2 is a block diagram of the operational support device according to the first embodiment.

FIG. 12 depicts graphs illustrating examples of the output patterns with respect to respective candidate stop times.

FIG. 13 depicts graphs illustrating examples of the life index values when the output patterns are as illustrated in FIG. 12.

DESCRIPTION OF EMBODIMENTS

Figure 3:
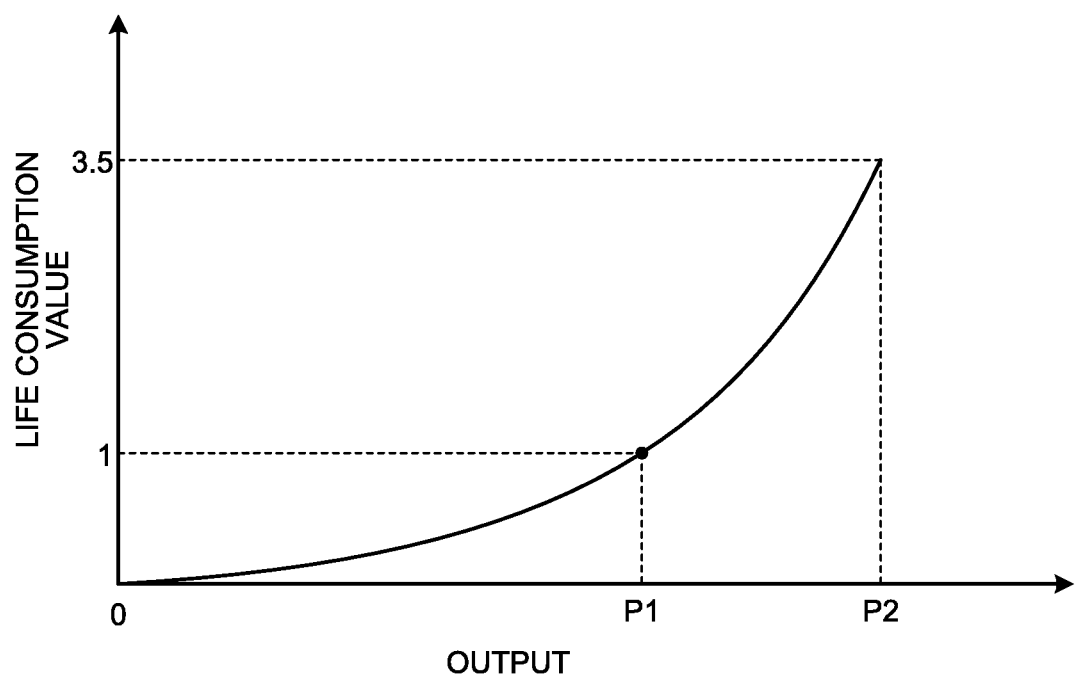
FIG. 3 is a graph illustrating an example of a relation between a life consumption value and an output.

The following describes preferred embodiments of the present invention in detail with reference to the accompanying drawings. The embodiments do not limit the present invention. When a plurality of embodiments are provided, the embodiments include those combined with other embodiments.

First Embodiment

A first embodiment of the present invention will first be described. FIG. 1 is a schematic block diagram of an operational support device according to the first embodiment. As illustrated in FIG. 1, an operational support device 10 according to the first embodiment is a device that supports operation of a power generation facility 1. The power generation facility 1 in the present embodiment is a power generation facility using a thermal power generation facility, more specifically, a gas turbine. The power generation facility 1 is, however, not limited to the power generation facility using the gas turbine, and may be any equipment.

The power generation facility 1 normally operates at a rated output or at an output lower than the rated output. The operation the rated output can be rephrased as an operation at a base load, a rated load, or a 100% load. Furthermore, the power generation facility 1 can also perform an operation under an overfiring condition. The overfiring refers to an operation at an output higher than the rated output, in other words, an operation at a load (for example, 110% load) higher than the load (100% load) of the base load operation. The operational support device 10 according to the first embodiment sets execution times of the overfiring of the power generation facility 1.

FIG. 2 is a block diagram of the operational support device according to the first embodiment. The operational support device 10 is, for example, a computer, and, as illustrated in FIG. 2, includes an input unit 12, an output unit 14, a storage unit 16, and a controller 18. The input unit 12 is a device that receives input from a user, and is, for example, a mouse and a keyboard, or a touchscreen panel. The output unit 14 is a device that displays, for example, a control result of the controller 18 and content of the input from the user, and is, for example, a display or the touchscreen panel, in the present embodiment. The storage unit 16 is a memory that stores, for example, content of calculation of the controller 18 and information on computer programs, and includes at least one of external storage devices, such as a random access memory (RAM), a read-only memory (ROM), and a hard disk drive (HDD). The controller 18 is an arithmetic device, that is, a central processing unit (CPU). The operational support device 10 may include a communication unit (communication interface) that communicates with an external device to transmit and receive information.

The controller 18 includes a time information acquisition unit 20, a life index value acquisition unit 22, a degree-of-contribution acquisition unit 24, an output pattern setting unit 26, an overfiring setting unit 28, and a bid block generation unit 30. Processing performed by these units can be said to be an operational support method of the present embodiment. The controller 18 reads software (computer program) stored in the storage unit 16 to implement the time information acquisition unit 20, the life index value acquisition unit 22, the degree-of-contribution acquisition unit 24, the output pattern setting unit 26, the overfiring setting unit 28, and the bid block generation unit 30, and these units perform the processing described below.

The time information acquisition unit 20 acquires information on a start time and a stop time, that is, information on when the start time and the stop time are to be reached. The start time refers to a date/time (timing) after the current time, and to a time at which the power generation facility 1 is to start operating. The power generation facility 1 is not limited to actually starting to operate at the start time. The power generation facility 1 may start to operate before the start time. The stop time refers to a time after the start time, and to a time (timing) at which the power generation facility 1 is scheduled to stop. The time information acquisition unit 20 may acquire the information on the start time and the stop time from the external device or the power generation facility 1, or may set the start time and the stop time, for example, based on settings by the user, or may read the start time and the stop time from the storage unit 16. The length of time from the start time to the stop time is, for example, approximately one year, but can be set to any value.

The life index value acquisition unit 22 acquires a life index value at the start time. The life index value refers to an index indicating a life of the power generation facility 1, and is an index indicating a remaining life of the power generation facility 1. More specifically, the life of the power generation facility 1 can be said to be a degree of deterioration of the power generation facility 1, and the remaining life (life index value) decreases as the deterioration progresses. The value of the life index value is changed in one direction by the operation of the power generation facility 1. More specifically, the value changes in one direction with the output of the power generation facility 1. The description that the value changes in one direction herein means that the value decreases. Therefore, the value of the life index value decreases but does not increase with the output of the power generation facility 1.

The amount of decrease in the life index value increases as the output of the power generation facility 1 increases. Herein, the amount of decrease in the life index value per unit time is defined as a life consumption value. In this case, the life consumption value changes in value with the output per unit time of the power generation facility 1, and more specifically, increases in value as the output per unit time of the power generation facility 1 increases. FIG. 3 is a graph illustrating an example of a relation between the life consumption value and the output. In the example of FIG. 3, the life consumption value increases as the output of the power generation facility 1 increases, and more specifically, the life consumption value increases in a quadratic manner as the output of the power generation facility 1 increases. In other words, the rate of increase in the life consumption value increases as the output of the power generation facility 1 increases.

The relation between the life consumption value and the output of the power generation facility 1, that is, the relation between the amount of decrease in the life index value and the output of the power generation facility 1 is set in advance, and may be set, for example, based on an analysis or an experiment. For example, the degree of deterioration of a turbine blade of the power generation facility 1 is determined according to ambient temperature, and the ambient temperature depends on the output of the power generation facility 1. Accordingly, when the remaining life of the turbine blade is assumed to be the life index value, the life index value is found to decrease with the output value of the power generation facility 1. However, the life index value is not limited to the remaining life of the turbine blade. The life index value may be set as a value that decreases with the output value of the power generation facility 1, for example, by comprehensively taking into account states of devices of the power generation facility 1. In the relation between the life consumption value and the output of the power generation facility 1 illustrated in FIG. 3, the life consumption value is zero when the output of the power generation facility 1 is zero; the life consumption value is 1 when the output of the power generation facility 1 is equal to a rated output P1; and the life consumption value is 3.5 when the output of the power generation facility is equal to an overfiring output P2. However, the relation between the life consumption value and the output of the power generation facility 1 illustrated in FIG. 3 is merely an example. The rated output P1 refers to the rated output (100% load) of the power generation facility 1, and the overfiring output P2 refers to the maximum output (for example, 110% load) when the power generation facility 1 performs an overfiring operation.

When the power generation facility 1 continuously operates, the life index value is reduced by an amount of the life consumption value each time the unit time elapses. For example, the life index value at the stop time is a value obtained by subtracting, from the life index value at the start time, a value obtained by integrating the life consumption value in each unit time from the start time to the stop time. Accordingly, the life index value decreases in value as the operation time of the power generation facility 1 elapses, and the rate of decrease thereof increases as the life consumption value increases, that is, as the output of the power generation facility 1 increases.

The life index value acquisition unit 22 also acquires the relation between the life consumption value (the amount of decrease in the life index value) and the output of the power generation facility 1, in addition to the life index value at the start time. The life index value acquisition unit 22 may acquire the life index value at the start time and the relation between the life consumption value and the output of the power generation facility 1 from the external device or the power generation facility 1, or may set the life index value and the relation, for example, based on settings by the user, or may read the life index value and the relation from the storage unit 16. For example, the life index value at the start time may be a value calculated based on a detection result of a sensor provided in the power generation facility 1. Hereinafter, the relation between the life consumption value and the output of the power generation facility 1 is referred to as "life-output relation" where appropriate.

The life index value may be set for each component of the power generation facility 1, or may be set as one value for the entire power generation facility 1. When the life index value is set for each component of the power generation facility 1, the life index value of a component having the highest life consumption value is preferably set as the life index value of the power generation facility 1.

Referring back to FIG. 2, the degree-of-contribution acquisition unit 24 acquires a degree of contribution. The degree of contribution refers to an index indicating a degree of contribution to a stable supply of electricity, and is assigned to an amount of electricity supply per unit time. The term "stable supply of electricity" means to reduce an imbalance between demand and supply of the electricity and variations in voltage and frequency of the electricity in a system in which the power generation facility 1 supplies the electricity so as to stabilize the supply of the electricity in the system. The degree of contribution is a value assigned to the amount of electricity supply per unit time, and therefore, changes in value unit time by unit time. The degree-of-contribution acquisition unit 24 acquires the degree of contribution in each unit time during the period from the start time to the stop time. The start time is after the current time, that is, a future time. Therefore, the degree-of-contribution acquisition unit 24 can be said to acquire a predicted value of the degree of contribution in the future.

Figure 4A:
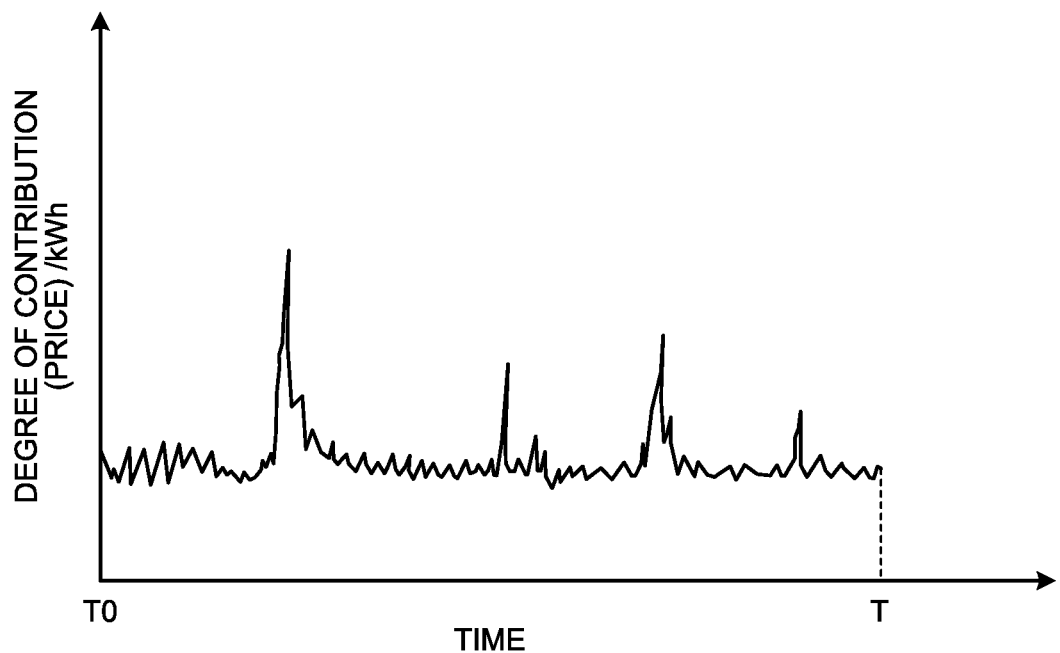
FIG. 4A is a graph illustrating an example of a degree of contribution.

FIG. 4A is a graph illustrating an example of the degree of contribution. The degree of contribution according to the present embodiment is a price of electricity in each unit time during the period from the start time to the stop time. As illustrated in FIG. 4A, the degree of contribution per unit time, that is, the price of electricity changes in value unit time by unit time. The degree-of-contribution acquisition unit 24 may acquire the degree of contribution during the period from the start time to the stop time from an external device, or may acquire the degree of contribution stored in advance in the storage unit 16, or may set the degree of contribution.

Figure 4B:
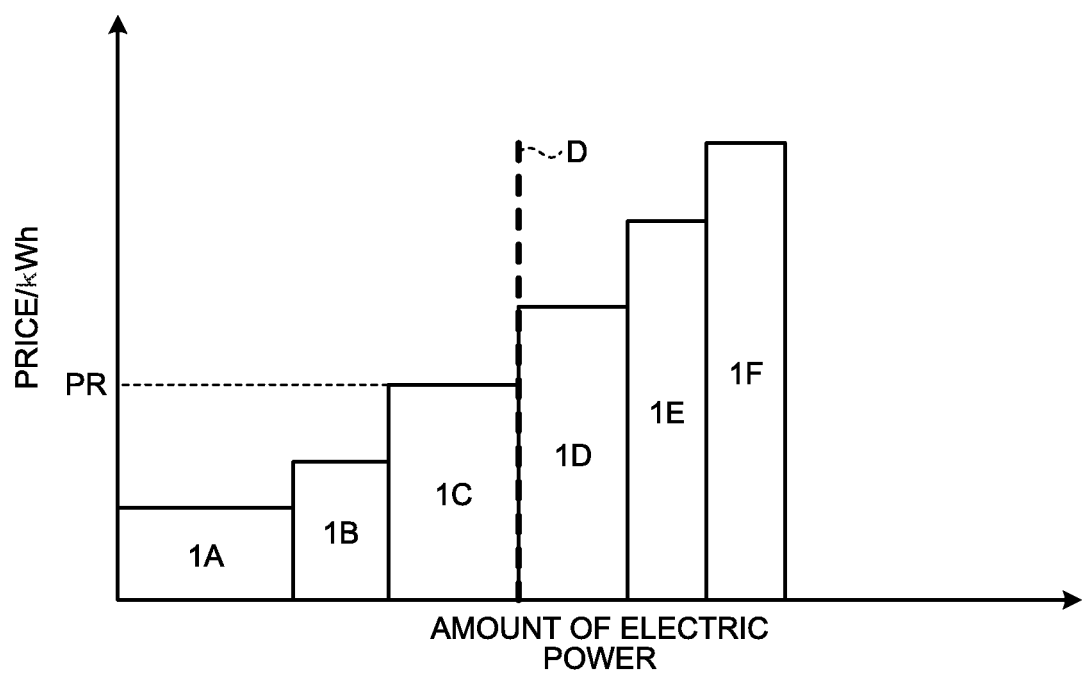
FIG. 4B is a graph illustrating an example of a method for setting a price of electricity.

The degree of contribution, that is, the price of electricity during the period from the start time to the stop time can be set based on a past value the degree of contribution, that is, a past value of the price of electricity. For example, the degree of contribution during the period from the start time to the stop time can be calculated as the predicted value based on the past value of the price of electricity and parameters (for example, date/time, atmospheric temperature, and a fuel price) affecting the price of electricity. In other words, the degree of contribution in the future during the period from the start time to the stop time can be calculated by performing the analysis using the past data as big data. The price of electricity during the period from the start time to the stop time can also be calculated based on an amount of power demand in each unit time from the start time to the stop time, and on amounts of electricity supply and power generating costs of a plurality of power generation facilities in the unit time. FIG. 4B is a graph illustrating an example of a method for setting the price of electricity. In the example of FIG. 4B, the horizontal axis represents an integrated value of a suppliable amount of electric power, and the vertical axis represents the price of electricity. The power generating cost of each of power generation facilities 1A, 1B, 1C, 1D, 1E, and 1F at the time of power generation increases in this order. In the example of FIG. 4B, the amount of electricity supply is accumulated from the power generation facility that is lowest in power generating cost, and a power generating cost PR at a point where the accumulated amount of electricity supply is equal to the amount of power demand (line segment D) is set as the price of electricity in the unit time. The above-described method for setting the price of electricity is, however, merely an example. Another method may be used to calculate the price of electricity in the future during the period from the start time to the stop time.

As described above, the degree-of-contribution acquisition unit 24 acquires the price of electricity per unit time as the degree of contribution in each unit time during the period from the start time to the stop time. In electricity markets, the price of electricity tends to be set higher as the degree of contribution to the stable supply of electricity increases. Accordingly, the degree of contribution can be rephrased as the price of electricity. The price of electricity may be set for each of the electricity markets, such as energy markets (for example, a day-ahead market, an intra-day market, and a real-time market) and ancillary services markets (for example, a reserve market and a balancing market). The degree of contribution is, however, not limited to the price of electricity as long as it is an index indicating the degree of contribution to the stable supply of electricity. For example, the degree of contribution may be a system frequency in each unit time or a system voltage in each unit time.

Referring back to FIG. 2, the output pattern setting unit 26 calculates the amount of electricity supply per unit time from the power generation facility 1 during the period from the start time to the stop time. Since the amount of electricity supply of the power generation facility 1 depends on the output of the power generation facility 1, the output pattern setting unit 26 can be said to set an output pattern per unit time of the power generation facility 1 during the period from the start time to the stop time.

The output pattern setting unit 26 acquires the life index value at the start time and the life-output relation (relation between the life consumption value and the output of the power generation facility 1) acquired by the life index value acquisition unit 22, the degree of contribution per unit time during the period from the start time to the stop time acquired by the degree-of-contribution acquisition unit 24, and a parameter value of performance of the power generation facility 1. The parameter value of the performance of the power generation facility 1 refers to a value of a parameter representing the performance of the power generation facility 1, and is a value of a parameter used for setting the output pattern of the power generation facility 1. Examples of the parameter value of the performance of the power generation facility 1 include the value of the rated output. The output pattern setting unit 26 may acquire the parameter value of the performance of the power generation facility 1 from the external device or the power generation facility 1, or may set the parameter value, for example, based on a setting by the user, or may read the parameter value from the storage unit 16.

The output pattern setting unit 26 sets the output pattern per unit time of the power generation facility 1 during the period from the start time to the stop time based on the parameter value of the performance of the power generation facility 1, the life index value at the start time, and the life-output relation. Specifically, the output pattern setting unit 26 sets the output pattern of the power generation facility 1 during the period from the start time to the stop time such that the life index value reaches a predetermined life value set in advance at the stop time. In more detail, the output pattern setting unit 26 sets the output pattern of the power generation facility 1 during the period from the start time to the stop time such that the life index value reaches the predetermined life value at the stop time, and an evaluation value during the period from the start time to the stop time is maximized. A specific description will be given below.

Figure 5:
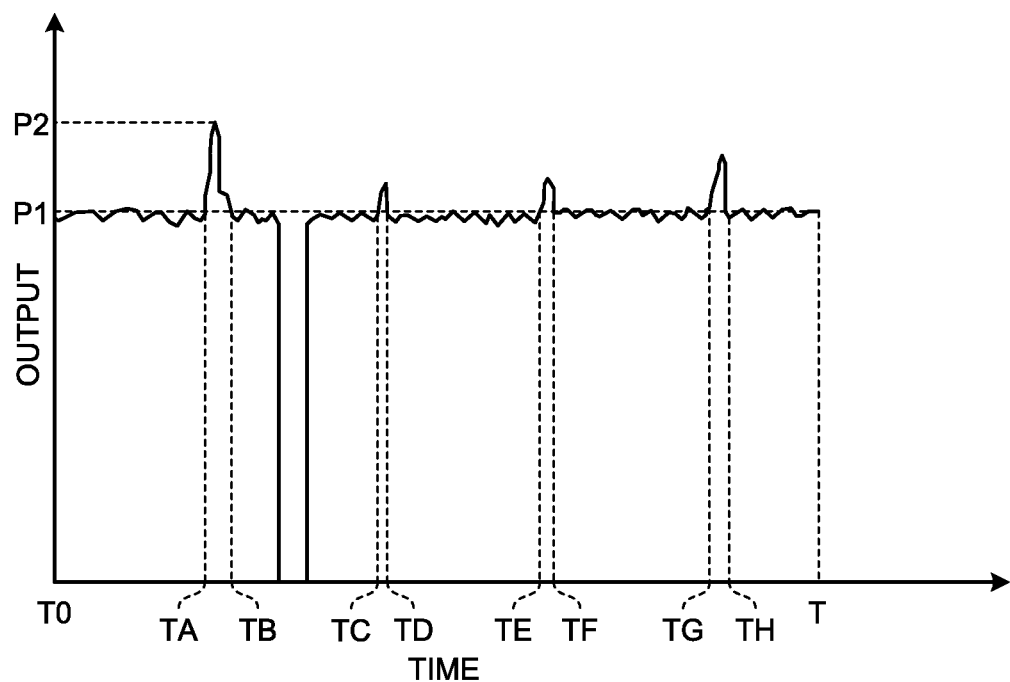
FIG. 5 is a graph illustrating an example of an output pattern per unit time during a period from a start time to a stop time.
Figure 6:
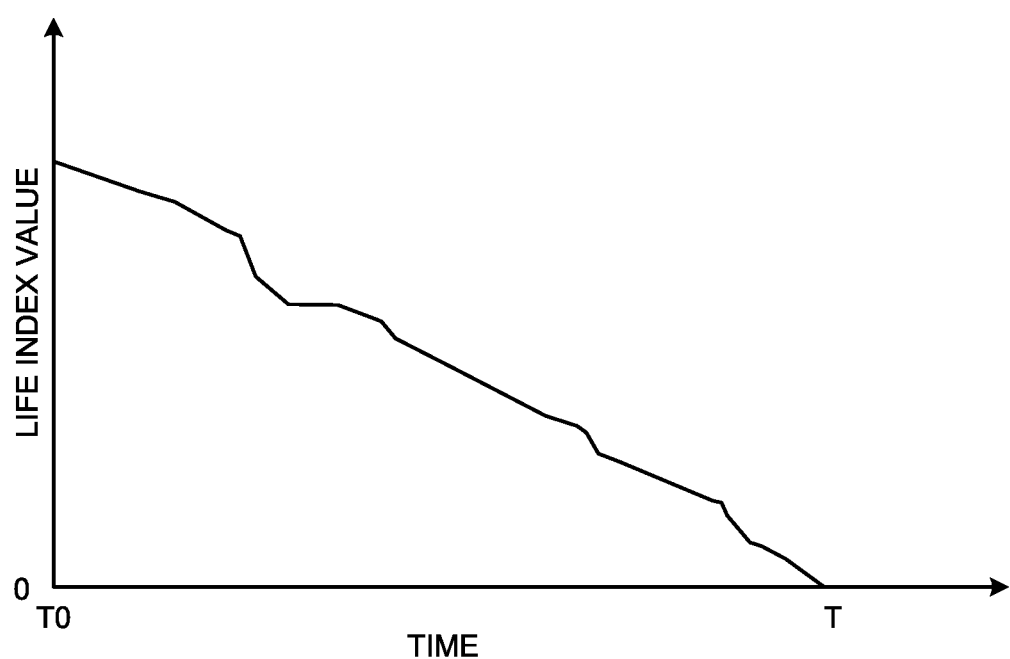
FIG. 6 is a graph illustrating an example of a life index value during the period from the start time to the stop time.

FIG. 5 illustrates an example of the output pattern per unit time during the period from the start time to the stop time. FIG. 6 illustrates an example of the life index value during the period from the start time to the stop time. As illustrated in the example of FIG. 6, the life index value decreases by the amount of the life consumption value each time the unit time elapses. The life consumption value is determined based on the life-output relation, and therefore, can be said to be determined based on the output per unit time of the power generation facility 1. Accordingly, as illustrated in the example of FIG. 5, the output pattern setting unit 26 can set the output pattern such that the difference between the life index value at the start time and the predetermined life value at the stop time is equal to the integrated value of the life consumption value from the start time to the stop time. By setting the output pattern described above, the life index value reaches the predetermined life value at the stop time.

The output pattern setting unit 26 allows the power generation facility 1 to perform the overfiring operation. In other words, the output pattern setting unit 26 can be said to set the output pattern per unit time such that the life index value reaches the predetermined life value at the stop time, and the output of the power generation facility 1 falls within the overfiring output P2.

In more detail, not one but a plurality of types of combinations of the output patterns per unit time are present by which the life index value reaches the predetermined life value at the stop time, and the output of the power generation facility 1 falls within the overfiring output P2. The output pattern setting unit 26 selects an output pattern by which the evaluation value during the period from the start time to the stop time is maximized from among the above-described combinations of the output patterns by which the life index value reaches the predetermined life value at the stop time, and selects the selected output pattern as the output pattern of the power generation facility 1 during the period from the start time to the stop time. The evaluation value refers herein to a value determined based on the degree of contribution (price of electricity) per unit time. In the present embodiment, the evaluation value refers to a revenue made when the power generation facility 1 has supplied the electricity. Accordingly, the evaluation value during the period from the start time to the stop time refers to a total value of the revenue obtained by supplying the electricity from the power generation facility 1. That is, the output pattern setting unit 26 selects an output pattern that maximizes the total value of the revenue during the period from the start time to the stop time as the output pattern of the power generation facility 1 during the period from the start time to the stop time from among the combinations of the output patterns by which the life index value reaches the predetermined life value at the stop time. In other words, the output pattern setting unit 26 can be said to set the output pattern of the power generation facility 1 during the period from the start time to the stop time such that the life index value reaches the predetermined life value at the stop time, and the total value of the revenue made by supplying the electricity during the period from the start time to the stop time is maximized. Moreover, in addition to using the setting method described above, the output pattern setting unit 26 may set the output pattern of the power generation facility 1 during the period from the start time to the stop time so as to satisfy a predetermined constraint condition. Examples of the predetermined constraint condition include a condition that the $CO_2$ emission amount is limited to a predetermined value or lower.

The evaluation value during the period from the start time to the stop time, that is, herein, the revenue is a value determined based on the degree of contribution (price of electricity) per unit time and the amount of electricity supply per unit time (output pattern per unit time). In other words, the revenue during the period from the start time to the stop time can be calculated by multiplying the amount of electricity supply per unit time by the price of electricity in that time period to calculate a revenue per unit time, and totaling the revenues per unit time. The evaluation value may be a profit obtained by subtracting expenses (for example, fuel prices and labor costs) required to supply the electricity from the revenue. The evaluation value is not limited to the revenue or the profit, and only needs to be a value calculated based on the degree of contribution per unit time and the amount of electricity supply per unit time (output pattern per unit time).

In the present embodiment, the predetermined life value at the stop time is zero. In other words, the output pattern setting unit 26 sets the output pattern such that the life index value at the stop time is zero. The predetermined life value is, however, not limited to zero, and may be any value, and further, may be a predetermined range of value instead of one value.

FIG. 5 is an example of the output pattern set by the output pattern setting unit 26. FIG. 5 illustrates an example of the output pattern per unit time during a period from a start time T0 to a stop time T. As illustrated in FIG. 5, the output pattern is set such that the output of the power generation facility 1 falls within the overfiring output P2. The output pattern setting unit 26 sets the output pattern such that the evaluation value, that is, the revenue is maximized, and consequently, sets the output pattern so as to increase the output at times when the degree of contribution (price of electricity) is higher. For example, the output pattern is set within an output range higher than the rated output P1 and equal to or lower than the overfiring output P2 at the times when the degree of contribution (price of electricity) is higher, and the output pattern is set within an output range equal to or lower than the rated output P1 at times when the degree of contribution (price of electricity) is lower. FIG. 6 illustrates an example of a transition of the predetermined life value during the period from the start time T0 to the stop time T when the operation is assumed to be performed according to the output pattern illustrated in FIG. 5. FIG. 6 illustrates the example in which the amount of decrease in the life index value is higher in periods of time when the output of the power generation facility 1 is higher, and the life index value is zero at the stop time T. The output pattern of FIG. 5 is merely an example. For example, the output pattern setting unit 26 may include a logic that takes into account the output of the power generation facility and deterioration (in, for example, efficiency and maximum power) of the facility with operating time.

Referring back to FIG. 2, based on the output pattern set by the output pattern setting unit 26, the overfiring setting unit 28 sets times in the period from the start time to the stop time at which the overfiring is to be performed. As described above, the output pattern set by the output pattern setting unit 26 includes the times when the overfiring operation is to be performed. The overfiring setting unit 28 extracts the times when the overfiring operation is scheduled to be performed, that is, the times when the output is higher than the rated output P1 and equal to or lower than the overfiring output P2 from the output pattern during the period from the start time T0 to the stop time T. The overfiring setting unit 28 sets the extracted times as the times when the overfiring is to be performed. In other words, in the example of FIG. 5, a time (timing) from TA to TB, a time from TC to TD, a time from TE to TF, and a time from TG to TH are set as the times when the overfiring is to be performed.

Performing the overfiring operation can increase the amount of electricity supply, and therefore, can increase the revenue. Performing the overfiring operation, however, increases the amount of reduction in life of the power generation facility 1. Accordingly, when the overfiring operation is excessively performed, for example, the power generation facility 1 may excessively deteriorate to run out of the life before the stop time is reached to perform periodical inspection, and may cause trouble in the power generation facility 1. In contrast, restraining the overfiring operation can restrain the life from running out, but leads to a loss of an opportunity to increase the revenue. Accordingly, to appropriately operate the power generation facility, the times when the overfiring operation is to be performed need to be appropriately set.

To counter this problem, the operational support device 10 according to the present embodiment sets the output pattern such that the life index value reaches the predetermined life value at the stop time, and based on the output pattern, sets the times when the overfiring operation is to be performed during the period from the start time to the stop time. Accordingly, the operational support device 10 can set the times when the overfiring operation is to be performed while predicting the remaining life, and therefore, can restrain the life from running out before the stop time is reached due to the excessive execution of the overfiring operation and restrain the opportunity to increase the revenue from being lost due to excessive reduction of the overfiring operation. Moreover, the operational support device 10 sets the times when the overfiring operation is to be performed in anticipation of the period from the start time to the stop time, and therefore, can restrain occurrence of a state where the power generation facility 1 cannot afford to perform the overfiring operation at times when the overfiring operation needs to be performed because the life is insufficient, and can appropriately cause the power generation facility 1 to perform the overfiring operation.

Moreover, in the present embodiment, the output pattern is set so as to maximize the evaluation value, that is, herein, the revenue. Accordingly, the overfiring operation can be performed at times when the revenue is predicted to be higher, and thus, the power generation facility can be appropriately operated. When the operational support device 10 has set the output pattern during the period from the start time to the stop time, the power generation facility 1 may be operated according to the output pattern from the start time to an intermediate time before the stop time. The intermediate time refers to a time between the start time and the stop time, and to a time after a predetermined time from the start time. In this case, the operational support device 10 newly sets the intermediate time as the start time, and resets the output pattern during a period from the new start time to the stop time. The power generation facility 1 may be operated according to the reset output pattern from the new start time to the intermediate time after the predetermined time has elapsed. This process may be further repeated. For example, if the start time is January 1 and the stop time is June 30, the power generation facility 1 operates for a time of one day from January 1 to January 2 based on the output pattern during a period from January 1 to June 30. Then, the operational support device 10 resets the output pattern during a period from January 2 to June 30, and the power generation facility 1 operates for a time of one day from January 2 to January 3 based on the output pattern during the period from January 2 to June 30. In this way, the output pattern is updated each time the operation is performed for the predetermined time before the stop time is reached so as to be capable of increasing operational accuracy.

Figure 7:
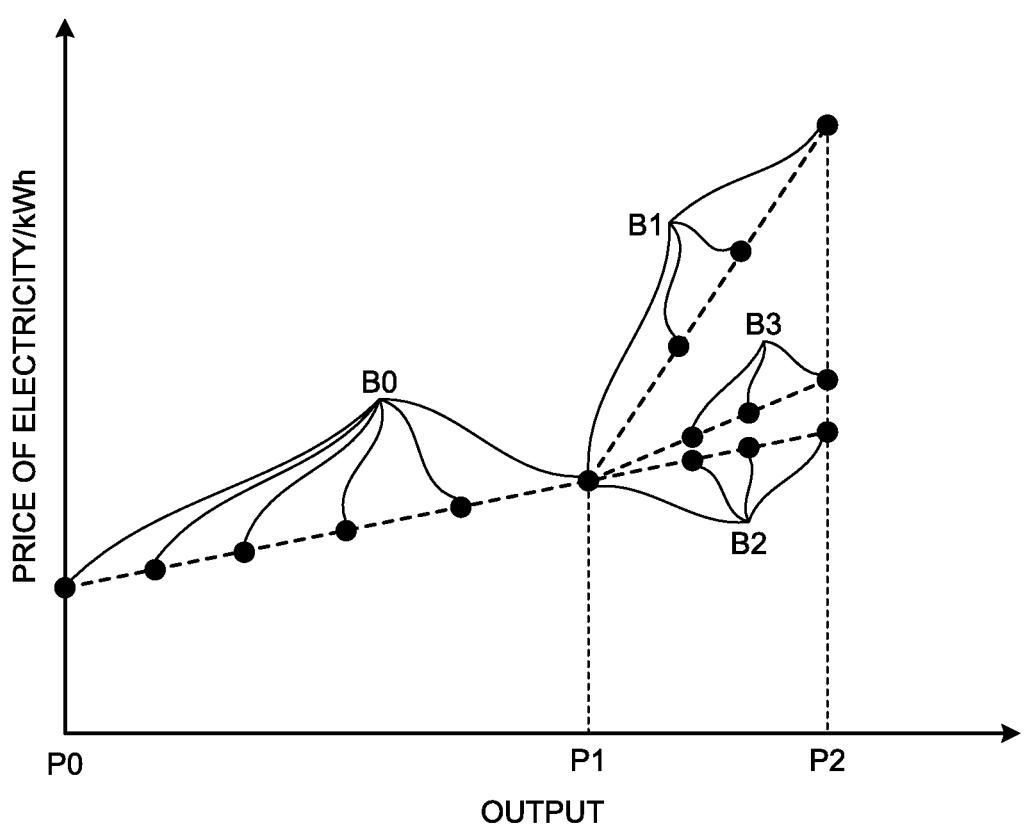
FIG. 7 is a graph illustrating an example of bid blocks.

The operational support device 10 causes the bid block generation unit 30 illustrated in FIG. 2 to generate bid blocks of the power generation facility 1. FIG. 7 is a graph illustrating an example of the bid blocks. As illustrated in FIG. 7, a bid block refers to information indicating the price of supplied electricity per unit time for each output of the power generation facility 1. In other words, the bid block can be said to be information indicating the price for each output of the electricity supplied by the power generation facility 1.

The bid block generation unit 30 generates the bid block in each unit time during the period from the start time to the stop time based on the output pattern set by the output pattern setting unit 26. The bid block generation unit 30 may generate the bid blocks in all the unit times during the period from the start time to the stop time, or may generate only bid blocks in some of the unit times. The bid block generation unit 30 generates rated bid blocks indicating the price of supplied electricity for each output up to the rated output P1 and high-output bid blocks indicating the price of supplied electricity for each output from the rated output P1 up to the overfiring output P2. In other words, the bid blocks generated by the bid block generation unit 30 include the rated bid blocks and the high-output bid blocks.

The bid block generation unit 30 generates the rated bid blocks based on an output efficiency of the power generation facility 1. Specifically, the bid block generation unit 30 acquires the output efficiency of the power generation facility 1 at a target time for which the bid blocks are to be generated. The output efficiency refers to an index indicating a relation between an input and an output. A higher output can be obtained from a lower input as the output efficiency is higher. The input is, for example, an amount of fuel, and the output is the output of the power generation facility 1. The output efficiency of the power generation facility 1 is calculated by, for example, substituting a detection value of a sensor for detecting the degree of deterioration of the power generation facility 1 into a calculation expression representing a relation between the detection value and the output efficiency. The calculation expression is established in advance by a test or an analysis. The output efficiency is, however, not limited to being calculated in this way, and may be calculated based on the output pattern set by the output pattern setting unit 26, or may be regressively derived from past operational data, or may be derived by, for example, machine learning.

The bid block generation unit 30 further acquires a predicted value of the expenses required to supply the electricity at the target time for which the bid blocks are to be generated. The expenses required to supply the electricity refers to, for example, cost for fuel, expenses for cost of chemicals for, for example, air pollution control, and labor costs. The predicted value of the expenses required to supply the electricity may be acquired using any method, and may be predicted by the bid block generation unit 30 using a predetermined algorithm, or may be acquired from an external device. The bid block generation unit 30 calculates a cost required per unit output of the power generation facility 1 based on the expenses required to supply the electricity and the output efficiency of the power generation facility 1, and sets the rated bid blocks in a range up to the rated output P1 based on the cost required per unit output. In the example of FIG. 7, data B0 represents the rated bid blocks in a range from a minimum output P0 to the rated output P1.

The bid block generation unit 30 also sets the high-output bid blocks. The bid block generation unit 30 sets the high-output bid blocks in a range from the rated output P1 to the overfiring output P2 based on the output pattern set by the output pattern setting unit 26. The bid block generation unit 30 determines whether the target time for which the bid blocks are to set is one of the times when the overfiring operation is set to be performed in the output pattern set by the output pattern setting unit 26, and makes the high-output bid blocks different between a case where the bid blocks are to be set at the time when the overfiring operation is to be performed and a case where the bid blocks are to be set at a time when the overfiring operation is not to be performed. If the bid blocks are to be set at the time when the overfiring operation is to be performed, the bid block generation unit 30 sets the price of electricity of the high-output bid blocks lower than that in the case where the bid blocks are to be set at the time when the overfiring operation is not to be performed. In other words, the bid block generation unit 30 sets the price of electricity at the time when the overfiring operation is set not to be performed to a higher price so as to prevent the electricity of the overfiring output P2 from being tendered, and thus to prevent the overfiring operation from being performed at that time.

In the example of FIG. 7, the high-output bid blocks at the time when the overfiring operation is set not to be performed serve as data B1, and the high-output bid blocks at the time when the overfiring operation is set to be performed serve as data B2. The price of electricity for the same output is higher for the data B1 than for the data B2. In more detail, the price of supplied electricity for the rated output P1 for the high-output bid blocks is equal to the price of supplied electricity for the rated output P1 for either of the data B1 and data B2. The gradient of a line segment (dashed line in FIG. 7) connecting together the data B1 for respective outputs representing a change in the price of electricity with respect to the output (rate of change in the price of electricity with respect to the output) is larger than the gradient of a line segment (dashed line in FIG. 7) connecting together the data B2 for the respective outputs representing the change in the price of electricity with respect to the output. In the example of FIG. 7, at the time when the overfiring operation is set to be performed, the gradient of the change in the price of electricity with respect to the output for the high-output bid blocks (line segment connecting together the data B2) is equal to the gradient of the change in the price of electricity with respect to the output for the rated bid blocks (line segment connecting together the data B0). In other words, the line segment connecting together the data B0 is continuous with the line segment connecting together the data B2. However, the high-output bid blocks at the time when the overfiring operation is set to be performed may be set as, for example, pieces of data B3 so as to make the gradient of the change in the price of electricity with respect to the output for the high-output bid blocks (line segment connecting together the data B3) larger than the gradient of the change in the price of electricity with respect to the output for the rated bid blocks. In other words, the price of electricity for the overfiring output P2 may be set to any value regardless of the price of supplied electricity for the rated output P1.

As described above, in the present embodiment, the bid block generation unit 30 generates the bid blocks. Generating the bid blocks in this way enables appropriate setting of the price of electricity up to the overfiring output P2.

Figure 8:
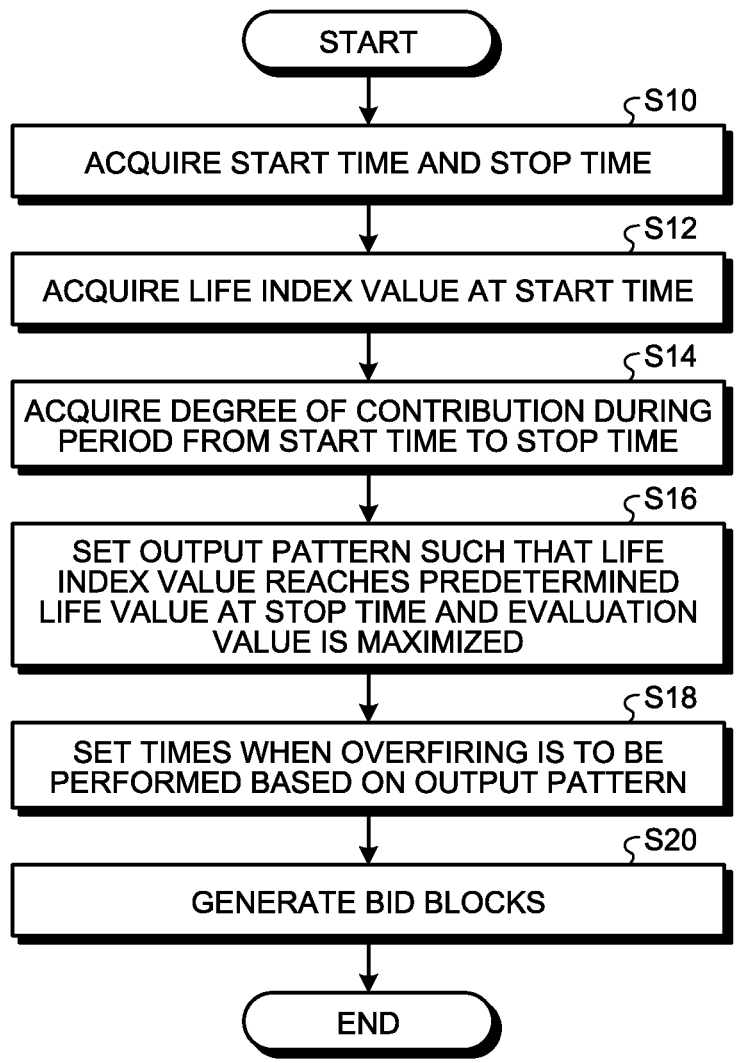
FIG. 8 is a flowchart for explaining a processing flow of the operational support device according to the first embodiment.

The operational support device 10 is configured as described above. The following describes a processing flow executed by the operational support device 10, based on a flowchart. FIG. 8 is the flowchart for explaining the processing flow of the operational support device according to the first embodiment. As illustrated in FIG. 8, the operational support device 10 causes the time information acquisition unit 20 to acquire the start time and the stop time (Step S10), causes the life index value acquisition unit 22 to acquire the life index value at the start time (Step S12), and causes the degree-of-contribution acquisition unit 24 to acquire the degree of contribution (herein, the price of electricity) during the period from the start time to the stop time (Step S14). The operational support device 10 causes the output pattern setting unit 26 to set the output pattern of the power generation facility 1 during the period from the start time to the stop time such that the life index value reaches the predetermined life value at the stop time, and the evaluation value during the period from the start time to the stop time is maximized (Step S16). The output pattern of the power generation facility 1 during the period from the start time to the stop time is set so as to fall within the range of the overfiring output P2. After the output pattern is set, the operational support device 10 causes the overfiring setting unit 28 to extract the times when the overfiring is to be performed from the output pattern, and set the extracted times as the times when the overfiring operation is to be performed (Step S18). After the times when the overfiring operation is to be performed are set, the operational support device 10 causes the bid block generation unit 30 to generate the bid blocks (Step S20). Thus, this processing ends. This processing may be performed a plurality of times while updating the start time. Doing so enables reflection of an up-to-date situation to set the more appropriate output pattern. The generation of the bid blocks is not essential in this processing.

As described above, the operational support device 10 according to the present embodiment sets the execution times of the overfiring serving as the operation of the power generation facility 1 at an output higher than the rated output P1, and includes the life index value acquisition unit 22, the output pattern setting unit 26, and the overfiring setting unit 28. The life index value acquisition unit 22 acquires the value at the start time of the life index value. The life index value is an index indicating the life of the power generation facility 1, and changes in value in one direction with the output of the power generation facility 1. The start time is a predetermined time after the current time. Based on the life index value at the start time, the output pattern setting unit 26 sets the output pattern per unit time of the power generation facility 1 during the period from the start time to the stop time such that the life index value reaches the predetermined value (predetermined life value) set in advance at the stop time after the start time. Based on the output pattern, the overfiring setting unit 28 sets the times in the period from the start time to the stop time at which the overfiring is to be performed.

The operational support device 10 according to the present embodiment sets the output pattern such that the life index value reaches the predetermined life value at the stop time, and based on the output pattern, sets the times when the overfiring operation is to be performed during the period from the start time to the stop time. Accordingly, the operational support device 10 can restrain the life from running out before the stop time is reached due to the excessive execution of the overfiring operation, and restrain the opportunity to increase the revenue from being lost due to excessive reduction of the overfiring operation. Moreover, the operational support device 10 can also restrain occurrence of a situation that the insufficient life prevents the overfiring operation from being performed at times when the overfiring operation needs to be performed. Accordingly, the operational support device 10 can present the appropriate times for the overfiring operation, and thereby, can support the appropriate operation of the power generation facility 1.

The operational support device 10 further includes the degree-of-contribution acquisition unit 24 that acquires the degree of contribution to the stable supply of electricity assigned to the amount of electricity supply per unit time in each unit time during the period from the start time to the stop time. Based on the life index value at the start time and the degree of contribution during the period from the start time to the stop time, the output pattern setting unit 26 sets the output pattern per unit time of the power generation facility 1 during the period from the start time to the stop time such that the life index value reaches the predetermined life value at the stop time, and the evaluation value during the period from the start time to the stop time is maximized. The evaluation value is a value based on the degree of contribution per unit time and the amount of electricity supply. The operational support device 10 sets the output pattern so as to maximize the evaluation value. Accordingly, the overfiring operation can be performed, for example, at times when the evaluation value such as the revenue is predicted to be higher, and the appropriate operation of the power generation facility 1 can be supported.

The degree-of-contribution acquisition unit 24 acquires the price of electricity set per unit time as the degree of contribution, and the output pattern setting unit 26 treats the revenue obtained by the power generation of the power generation facility 1 as the evaluation value. The operational support device 10 sets the output pattern such that the life index value reaches the predetermined life value at the stop time, and the revenue during the period from the start time to the stop time is maximized. Accordingly, the operational support device 10 can cause the overfiring operation to be performed at the times when the evaluation value such as the revenue is predicted to be higher, and can support the appropriate operation of the power generation facility 1.

The output pattern setting unit 26 sets the output pattern so as to increase the output of the power generation facility 1 at the times when the degree of contribution is higher. Since the operational support device 10 causes the output of the power generation facility 1 to be increased at the times when the degree of contribution is higher, the operational support device 10 can cause the overfiring operation to be performed at the times when the evaluation value such as the revenue is predicted to be higher, and can support the appropriate operation of the power generation facility 1.

The operational support device 10 further includes the bid block generation unit 30 that generates the bid blocks based on the output pattern. Each of the bid blocks is the information indicating the price of supplied electricity per unit time for each output of the power generation facility 1. The operational support device 10 generates the bid blocks in this way so as to be capable of appropriately setting the price of electricity up to the overfiring output P2.

The bid block generation unit 30 generates the rated bid blocks indicating the price of supplied electricity for each output up to the rated output P1 based on the output efficiency of the power generation facility 1. The bid block generation unit 30 generates, based on the output of the power generation facility 1 set by the output pattern, the high-output bid blocks indicating the price of supplied electricity for each output when the overfiring is performed. The operational support device 10 generates the rated bid blocks and the high-output bid blocks in this way so as to be capable of appropriately setting the price of electricity up to the overfiring output P2.

Second Embodiment

The following describes a second embodiment of the present invention. An operational support device 10a according to the second embodiment differs from the operational support device 10 according to the first embodiment in that the stop time is set from among a plurality of candidate stop times. In the second embodiment, portions having configurations common to those of the first embodiment will not be described.

Figure 9:
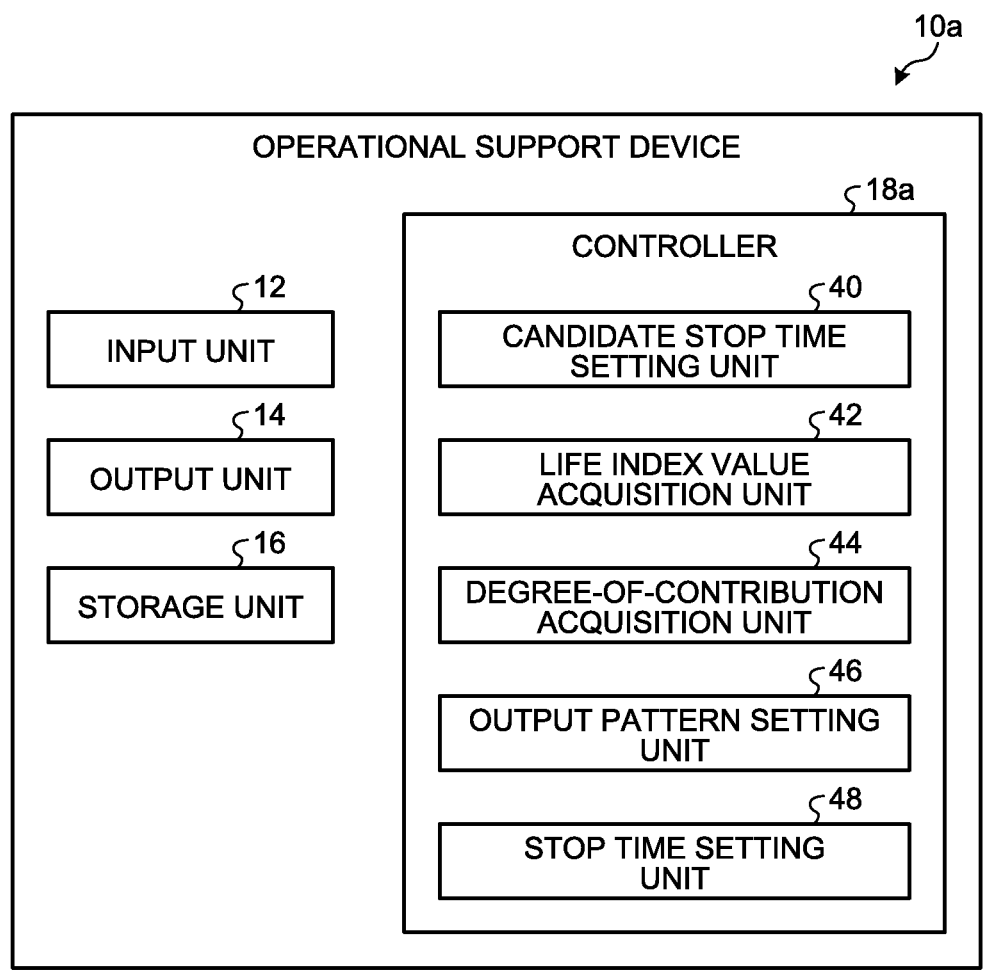
FIG. 9 is a block diagram of an operational support device according to a second embodiment of the present invention.

FIG. 9 is a block diagram of the operational support device according to the second embodiment. As illustrated in FIG. 9, a controller 18a of the operational support device 10a according to the second embodiment includes a candidate stop time setting unit 40, a life index value acquisition unit 42, a degree-of-contribution acquisition unit 44, an output pattern setting unit 46, and a stop time setting unit 48. Processing performed by these units can be said to be an operational support method of the present embodiment. The controller 18a reads software (computer program) stored in the storage unit 16 to implement the candidate stop time setting unit 40, the life index value acquisition unit 42, the degree-of-contribution acquisition unit 44, the output pattern setting unit 46, and the stop time setting unit 48, and these units perform the processing described below.

The candidate stop time setting unit 40 sets the candidate stop times. The candidate stop time setting unit 40 acquires information on the start time, that is, information on when the start time is. In the same way as in the first embodiment, the start time refers to a date/time (timing) after the current time. The candidate stop times are times (timing) serving as candidates for the stop time, and are times after the start time.

The candidate stop time setting unit 40 sets the candidate stop times. The candidate stop time setting unit 40 acquires one candidate stop time, for example, using the same method as the method used by the time information acquisition unit 20 of the first embodiment to acquire the stop time. The candidate stop time setting unit 40 sets a time (timing) shifted in time by a predetermined period of time from one candidate stop time as another candidate stop time. In this way, the candidate stop time setting unit 40 sets the candidate stop times shifted in time from one another. Any method can, however, be used to set the candidate stop times.

The life index value acquisition unit 42 acquires the life index value at the start time and the life-output relation (relation between the amount of decrease in the life index value and the output of the power generation facility 1). The life index value acquisition unit 42 uses the same method as that used by the life index value acquisition unit 22 of the first embodiment to acquire the life index value at the start time and the life-output relation.

The degree-of-contribution acquisition unit 44 acquires the degree of contribution (for example, the price of electricity per unit time) during a period from the start time to each of the candidate stop times. The degree-of-contribution acquisition unit 44 uses the same method as that used by the degree-of-contribution acquisition unit 24 of the first embodiment to acquire the degree of contribution except in that the degree-of-contribution acquisition unit 44 acquires the degree of contribution during the period from the start time to each of the candidate stop times instead of acquiring the degree of contribution during the period from the start time to the stop time.

The output pattern setting unit 46 acquires the life index value at the start time and the life-output relation (relation between the life consumption value and the output of the power generation facility 1) acquired by the life index value acquisition unit 42, the degree of contribution per unit time during the period from the start time to each of the candidate stop times acquired by the degree-of-contribution acquisition unit 44, and the parameter value of the performance of the power generation facility 1. The output pattern setting unit 46 sets the output pattern per unit time of the power generation facility 1 during the period from the start time to each of the candidate stop times based on the parameter value of the performance of the power generation facility 1, the life index value at the start time, and the life-output relation. Specifically, the output pattern setting unit 46 sets the output pattern of the power generation facility 1 during the period from the start time to each of the candidate stop times such that the life index value reaches the predetermined life value set in advance at each of the candidate stop times. In more detail, the output pattern setting unit 46 sets the output pattern of the power generation facility 1 during the period from the start time to each of the candidate stop times such that the life index value reaches the predetermined life value at each of the stop times, and an evaluation value during the period from the start time to each of the candidate stop times is maximized. The evaluation value in the second embodiment refers to the same value as the evaluation value (for example, the revenue) of the first embodiment.

The output pattern setting unit 46 differs from the output pattern setting unit 26 of the first embodiment in that the output pattern setting unit 46 sets the output pattern of the power generation facility 1 during the period to each of the stop times instead of to the stop time. The stop time setting unit 48 sets the stop time based on the output pattern up to each of the candidate stop times set by the output pattern setting unit 46. The following describes details of a method for setting the output pattern of the power generation facility 1 during the period from the start time to each of the candidate stop times and a method for setting the stop time based on the set output pattern.

One of the candidate stop times is denoted as a first candidate stop time. In this case, the output pattern setting unit 46 sets the output pattern of the power generation facility 1 during a period from the start time to the first candidate stop time such that the life index value reaches the predetermined life value at the first candidate stop time, and the evaluation value during the period from the start time to the first candidate stop time is maximized. In other words, the output pattern setting unit 46 uses the same method as that used by the output pattern setting unit 26 of the first embodiment to set the output pattern except in that the first candidate stop time is used instead of the stop time.

Figure 10:
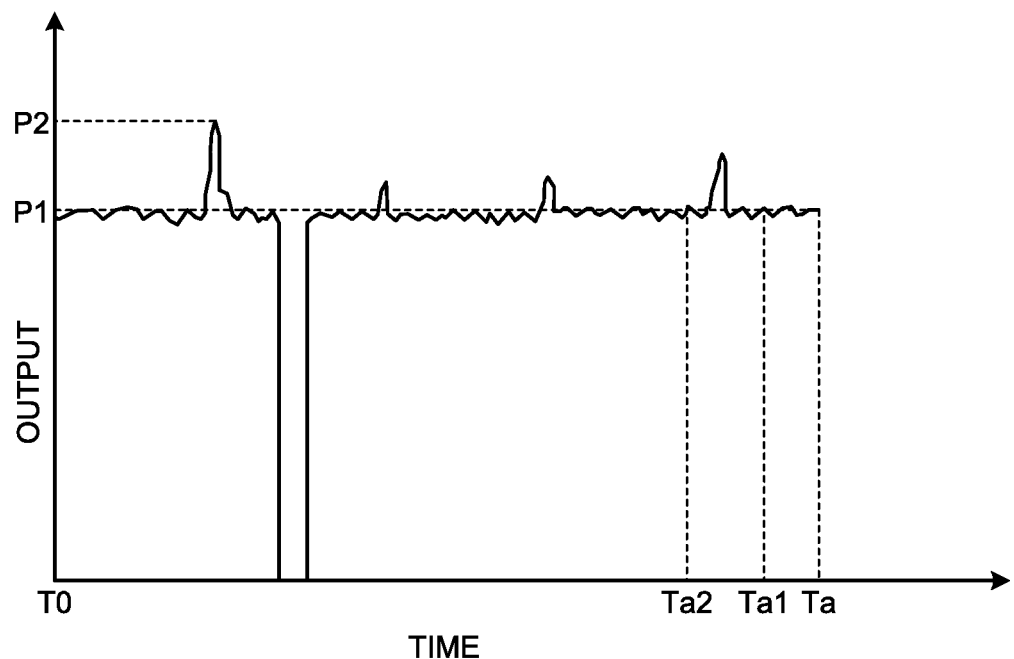
FIG. 10 is a graph illustrating an example of the output pattern per unit time during a period from the start time to a first candidate stop time.
Figure 11:
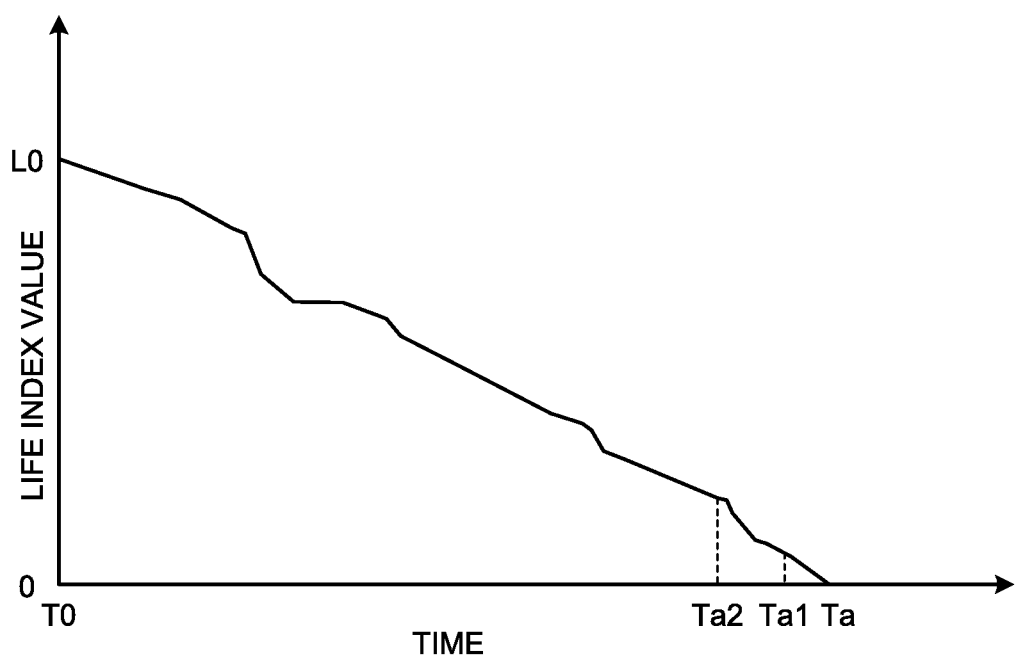
FIG. 11 is a graph illustrating an example of the life index value when the output pattern is as illustrated in FIG. 10.

FIG. 10 illustrates an example of the output pattern per unit time during the period from the start time to the first candidate stop time. FIG. 11 illustrates an example of the life index value when the output pattern is as illustrated in FIG. 10. FIG. 10 illustrates the example of the output pattern of the power generation facility 1 during the period from the start time T0 to a first candidate stop time Ta. The stop time setting unit 48 sets the stop time based on the output pattern of the power generation facility 1 during the period from the start time to the first candidate stop time set by the output pattern setting unit 46. In more detail, the stop time setting unit 48 calculates an operational index of the power generation facility 1 in a case where the power generation facility 1 is operated according to the output pattern set by the output pattern setting unit 46 from the start time T0 to the first candidate stop time Ta. The operational index refers to an index value indicating an operational state of the power generation facility 1, and in the present embodiment, includes the revenue of the power generation facility 1 and a value obtained by converting the life index value of the power generation facility 1 into a revenue. Accordingly, in the case where the power generation facility 1 is operated from the start time T0 to the first candidate stop time Ta, the operational index can be said to be a total value of a total revenue of the power generation facility 1 in the case where the power generation facility 1 is operated from the start time T0 to the first candidate stop time Ta and the value obtained by converting the life index value of the power generation facility 1 at the first candidate stop time Ta into the revenue. The revenue of the power generation facility 1 in the case where the power generation facility 1 is operated from the start time T0 to the first candidate stop time Ta may include a revenue that is not obtained because the power generation facility 1 is stopped at the first candidate stop time Ta, and the revenue obtained by operating the power generation facility 1 from the start time T0 to the first candidate stop time Ta. If the life index value is higher than zero, that is, if the life of the power generation facility 1 is remaining, the facility can be reused at another place, or the power generation facility 1 can be operated until the remaining life runs out. Accordingly, for example, a revenue that would be obtained if the facility is reused or operated until the remaining life runs out can be calculated as the value obtained by converting the life index value into the revenue. However, the operational index is not limited to the total value of the revenue of the power generation facility 1 and the value obtained by converting the life index value of the power generation facility 1 into the revenue, and can be set to any value. For example, the operational index may include at least one of the revenue of the power generation facility 1 and the value obtained by converting the life index value of the power generation facility 1 into the revenue.

Of the candidate stop times, candidate stop times other than the first candidate stop time Ta are denoted as second candidate stop times. The stop time setting unit 48 calculates the operational index of the power generation facility 1 in a case where the power generation facility 1 is operated from the start time T0 to each of the second candidate stop times based on the output pattern set by the output pattern setting unit 46, that is, the output pattern of the power generation facility 1 during the period from the start time to the first candidate stop time Ta. In other words, the stop time setting unit 48 uses the output pattern set based on the first candidate stop time Ta to calculate also the operational index of the power generation facility 1 during each of the candidate stop times other than the first candidate stop time Ta. In the example of FIG. 10, second candidate stop times Ta1 and Ta2 are set. In this case, the stop time setting unit 48 calculates the operational index in the case where the power generation facility 1 is operated from start time T0 to the second candidate stop time Ta1 and the operational index in the case where the power generation facility 1 is operated from start time T0 to the second candidate stop time Ta2 based on the output pattern of the power generation facility 1 during the period from the start time to the first candidate stop time Ta.

The stop time setting unit 48 sets the stop time from among the first candidate stop time and the second candidate stop times based on the output pattern with respect to the first candidate stop time. Specifically, the stop time setting unit 48 compares the operational indices resulting from the respective candidate stop times, and sets the stop time based on the results of the comparison. In the present embodiment, the stop time setting unit 48 sets a candidate stop time providing the highest operational index from among the operational indices resulting from the respective candidate stop times as the stop time. In the example of FIG. 10, the stop time setting unit 48 sets the candidate stop time providing the highest operational index from among the first candidate stop time Ta, the second candidate stop time Ta1, and the second candidate stop time Ta2 as the stop time. In the example of FIG. 10, the revenue is higher if the power generation facility 1 is operated until the first candidate stop time Ta. However, as illustrated in FIG. 11, if the power generation facility 1 is operated until the second candidate stop time Ta1 or Ta2, the life index value is higher, and the value of the revenue converted from the life index value is higher by that much. Accordingly, including the life index value in the operational index allows an appropriate time to be set as the stop time by also take into account the life.

As described above, the stop time setting unit 48 calculates the revenue that is not obtained because the power generation facility 1 is stopped at the first candidate stop time Ta, the revenue obtained by operating the power generation facility 1 from the start time T0 to the first candidate stop time Ta, and the life index value at the first candidate stop time Ta as the operational index based on the output pattern with respect to the first candidate stop time Ta. The stop time setting unit 48 calculates revenues that are not obtained because the power generation facility 1 is stopped at the second candidate stop times Ta1 and Ta2, revenues obtained by operating the power generation facility 1 from the start time T0 to the second candidate stop times Ta1 and Ta2, and the life index values at the second candidate stop times Ta1 and Ta2 as the operational indices based on the output pattern with respect to the first candidate stop time Ta. The stop time setting unit 48 compares these operational indices, and based on the results of the comparison, sets the stop time from among the first candidate stop time Ta and the second candidate stop times Ta1 and Ta2.

In the example of FIG. 10, three candidate stop times, that is, one first candidate stop time and two second candidate stop times are set. However, the number of the candidate stop times is not limited to three, and may be any number. In the example of FIG. 10, the second candidate stop times are set as times before the first candidate stop time. However, the second candidate stop times may be set as times after the first candidate stop time. However, since the stop times are set based on the output pattern to the first candidate stop time, the second candidate stop times are preferably set as the times before the first candidate stop time.

In the above description, the stop time is set based on the output pattern with respect to one candidate stop time (first candidate stop time Ta). However, the output patterns may be calculated with respect to the respective candidate stop times, and the stop time may be set based on the output patterns. The following describes this case.

FIG. 12 illustrates examples of the output patterns with respect to the respective candidate stop times. FIG. 13 illustrates examples of the life index values when the output patterns are as illustrated in FIG. 12. In each of these examples, with respect to a corresponding one of the candidate stop times, the output pattern setting unit 46 sets the output pattern of the power generation facility 1 during the period from the start time to the candidate stop time such that the life index value reaches the predetermined life value at the candidate stop time, and the evaluation value during the period from the start time to the candidate stop time is maximized. In the examples of FIG. 12, the output pattern setting unit 46 calculates the output patterns with respect to the first candidate stop time Ta and the second candidate stop times Ta1 and Ta2. Since the output patterns are set in this way, as illustrated in FIG. 13, for each of the output patterns, the life index value reaches the predetermined life value (in this case, zero) at the corresponding one of the candidate stop times (the first candidate stop time Ta and the second candidate stop times Ta1 and Ta2 in FIG. 13).

Based on the output patterns set by the output pattern setting unit 46 with respect to the respective candidate stop times, the stop time setting unit 48 sets the stop time from among the candidate stop times. In this case, based on the output patterns set by the output pattern setting unit 46, the stop time setting unit 48 calculates the operational indices with respect to the candidate stop times used for the output patterns, and thus, calculates the operational indices with respect to the respective candidate stop times. According to the examples of FIG. 12, the stop time setting unit 48 calculates the operational index with respect to the first candidate stop time Ta based on the output pattern during the period from the start time T0 to the first candidate stop time Ta, calculates the operational index with respect to the second candidate stop time Ta1 based on the output pattern during the period from the start time T0 to the second candidate stop time Ta1, and calculates the operational index with respect to the second candidate stop time Ta2 based on the output pattern during the period from the start time T0 to the second candidate stop time Ta2.

The stop time setting unit 48 compares the operational indices resulting from the respective candidate stop times, and sets the stop time based on the results of the comparison. In the present embodiment, the stop time setting unit 48 sets a candidate stop time providing the highest operational index from among the operational indices resulting from the respective candidate stop times as the stop time. In the examples of FIG. 12, the stop time setting unit 48 sets a candidate stop time providing the highest operational index from among the first candidate stop time Ta, the second candidate stop time Ta1, and the second candidate stop time Ta2 as the stop time. In this case, each of the operational indices is the total value of the revenue in the case where the power generation facility 1 is operated to the corresponding one of the candidate stop times. In this case, the operational index may include the revenue that is not obtained because the power generation facility 1 is stopped at the candidate stop time, and the revenue obtained by operating the power generation facility 1 from the start time to the candidate stop time. The operational index may also include the life index value at the candidate stop time. In these examples, however, the life index values are equal (predetermined life value) at the respective candidate stop times. Therefore, the operational index need not to include the life index value.

As described above, in the case of setting the output patterns with respect to the respective candidate stop times, the stop time setting unit 48 compares the revenues that are not obtained because the power generation facility 1 is stopped at the respective candidate stop times and the revenues obtained by operating the power generation facility 1 from the start time to the respective candidate stop times among the candidate stop times, and based on the results of the comparison, sets the stop time from among the candidate stop times.

In the same way as in the first embodiment, the output pattern setting unit 46 according to the second embodiment sets the output pattern while allowing the power generation facility 1 to perform the overfiring operation. In other words, the output pattern setting unit 46 can be said to set the output pattern such that the output of the power generation facility 1 falls within the overfiring output P2. However, the output pattern setting unit 46 according to the second embodiment may set the output pattern so as to limit the output of the power generation facility 1 within the rated output P1 without allowing the power generation facility 1 to perform the overfiring operation.

Figure 14:
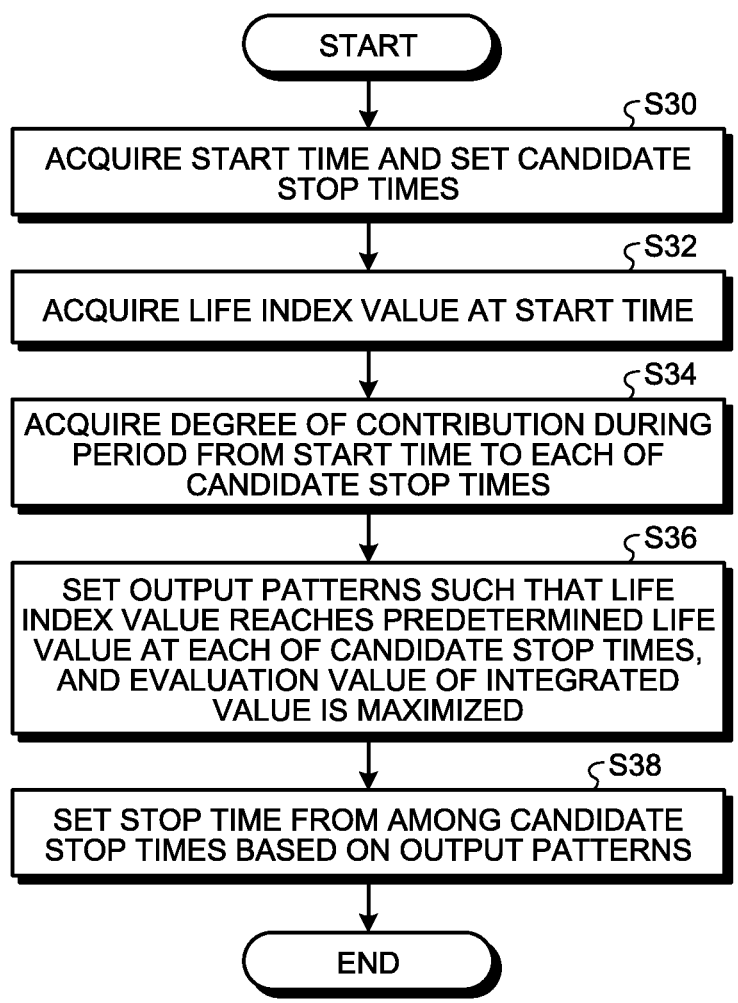
FIG. 14 is a flowchart for explaining a processing flow of the operational support device according to the second embodiment.

The operational support device 10a according to the second embodiment is configured as described above. The following describes a processing flow, that is, an operational support method for the power generation facility 1 executed by the operational support device 10a, based on a flowchart. FIG. 14 is the flowchart explaining for the processing flow of the operational support device according to the second embodiment. As illustrated in FIG. 14, the operational support device 10a causes the candidate stop time setting unit 40 to acquire the start time and set the candidate stop times (Step S30), causes the life index value acquisition unit 42 to acquire the life index value at the start time (Step S32), and causes the degree-of-contribution acquisition unit 44 to acquire the degree of contribution (herein, the price of electricity) during the period from the start time to each of the candidate stop times (Step S34). The operational support device 10a causes the output pattern setting unit 46 to set the output patterns of the power generation facility 1 during the periods from the start time to the candidate stop times such that the life index value reaches the predetermined life value at each of the candidate stop times, and the evaluation value (for example, the revenue) during the period from the start time to each of the candidate stop times is maximized (Step S36). After the output patterns are set, the operational support device 10a causes the stop time setting unit 48 to set the stop time from among the candidate stop times based on the output patterns (Step S38). As described above, the stop time setting unit 48 may set the stop time based on the output pattern with respect to one candidate stop time (first candidate stop time Ta), or may set the stop time based on the output patterns with respect to the respective candidate stop times.

As described above, the operational support device 10a according to the second embodiment sets the stop time to stop operating the power generation facility 1, and includes the candidate stop time setting unit 40, the life index value acquisition unit 42, the degree-of-contribution acquisition unit 44, the output pattern setting unit 46, and the stop time setting unit 48. The candidate stop time setting unit 40 sets the candidate stop times serving as the candidates for the stop time. The life index value acquisition unit 42 acquires the value of the life index value at the start time. The degree-of-contribution acquisition unit 44 acquires the degree of contribution to the stable supply of electricity in each unit time during the period from the start time to each of the candidate stop times. Based on the life index value at the start time and the degrees of contribution during the periods from the start time to the candidate stop times, the output pattern setting unit 46 sets the output patterns per unit time of the power generation facility 1 during the periods from the start time to the candidate stop times such that the life index value reaches the predetermined life value at each of the candidate stop times, and the evaluation value during the period from the start time to the candidate stop time is maximized. The stop time setting unit 48 sets the stop time based on the output patterns.

While the stop time is set to stop operating the power generation facility 1 for, for example, maintenance, the stop time is required to be appropriately set in order to appropriately operate the power generation facility 1. That is, if the stop time is too late, the deterioration of the components of the power generation facility 1 may not be detected, and may cause trouble in the power generation facility 1. In contrast, if the stop time is too early, the opportunity to obtain revenue may be lost during a period of the stop. To counter this problem, the operational support device 10*a* according to the present embodiment sets the candidate stop times and sets the output patterns such that the life index value reaches the predetermined life value at each of the candidate stop times, and the evaluation value is maximized. The operational support device 10*a* sets the stop time based on the output patterns. Accordingly, the operational support device 10*a* sets the stop time based on the output patterns while predicting the remaining life, and therefore, can appropriately set the stop time to appropriately operate the power generation facility 1. Since the revenue is employed as the evaluation value, the stop time can be appropriately set taking into account the remaining life and the revenue.

The output pattern setting unit 46 sets the output patterns such that the overfiring serving as the operation at an output higher than the rated output P1 is performed during the periods from the start time to the candidate stop times. The operational support device 10*a* sets the output patterns in anticipation of the overfiring, and therefore, can appropriately set the stop time more appropriately taking into account the remaining life and the revenue.

The candidate stop time setting unit 40 sets the candidate stop times, and the output pattern setting unit 46 sets the output patterns with respect to the respective candidate stop times. The stop time setting unit 48 sets the stop time from among the candidate stop times based on the output patterns with respect to the respective candidate stop times. The operational support device 10*a* sets the output patterns with respect to the respective candidate stop times so as to be capable of more appropriately setting the stop time.

The stop time setting unit 48 compares the revenues that are not obtained because the power generation facility 1 is stopped at the respective candidate stop times and the revenues obtained by operating the power generation facility 1 from the start time to the respective candidate stop times among the candidate stop times. The stop time setting unit 48 sets the stop time from among the candidate stop times based on the results of the comparison. The operational support device 10*a* takes into account the loss of the opportunity to obtain the revenue caused by stopping the operation and the revenue-earning opportunity obtained by not stopping the operation, and thereby, can more appropriately set the stop time.

The output pattern setting unit 46 sets the output pattern with respect to the first candidate stop time Ta serving as one of the candidate stop times. Based on the output pattern with respect to the first candidate stop time Ta, the stop time setting unit 48 sets the stop time from among the first candidate stop time Ta and the second candidate stop times Ta1 and Ta2 serving as candidates for the stop time other than the first candidate stop time Ta. The operational support device 10*a* sets the stop time based on the output pattern with respect to one candidate stop time, and therefore, can appropriately set the stop time while reducing a computational load.

The stop time setting unit 48 calculates the revenue that is not obtained because the power generation facility 1 is stopped at the first candidate stop time Ta, the revenue obtained by operating the power generation facility 1 from the start time T0 to the first candidate stop time Ta, and the life index value at the first candidate stop time Ta as the operational index based on the output pattern with respect to the first candidate stop time Ta. The stop time setting unit 48 calculates the revenues that are not obtained because the power generation facility 1 is stopped at the second candidate stop times Ta1 and Ta2, the revenues obtained by operating the power generation facility 1 from the start time T0 to the second candidate stop times Ta1 and Ta2, and the life index values at the second candidate stop times Ta1 and Ta2 as the operational indices based on the output pattern with respect to the first candidate stop time Ta. The stop time setting unit 48 compares these operational indices, and based on the results of the comparison, sets the stop time from among the first candidate stop time Ta and the second candidate stop times Ta1 and Ta2. The operational support device 10*a* takes into account the loss of the opportunity to obtain the revenue caused by stopping the operation, the revenue-earning opportunity obtained by not stopping the operation, and the remaining life, and thereby, can more appropriately set the stop time.

Third Embodiment

The following describes a third embodiment of the present invention. An operational support device 10*b* according to the third embodiment differs from the counterpart according to the first embodiment in that the maximum output of the power generation facility is set based on an external environmental condition value. In the third embodiment, portions having configurations common to those of the first embodiment will not be described.

Figure 15:
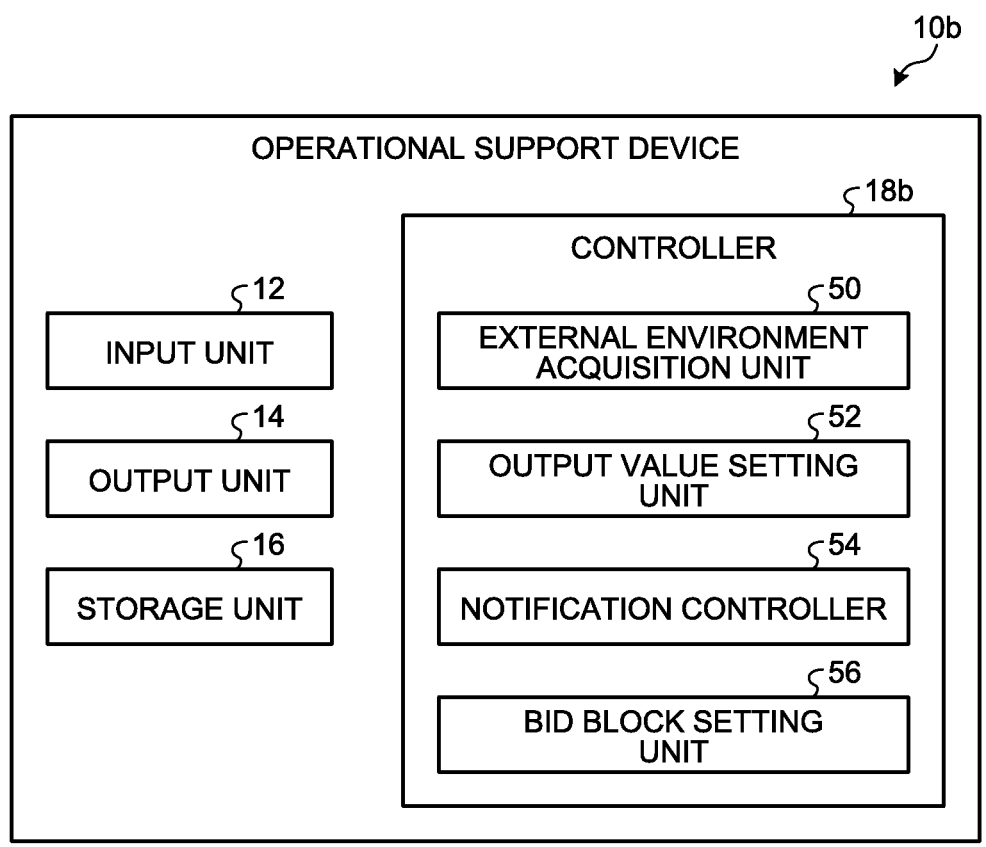
FIG. 15 is a block diagram of an operational support device according to a third embodiment of the present invention.

FIG. 15 is a block diagram of the operational support device according to the third embodiment. The operational support device 10*b* sets the output of the power generation facility 1 at a predetermined time that is a predetermined time (timing) after the current time. As illustrated in FIG. 15, a controller 18*b* of the operational support device 10*b* according to the third embodiment includes an external environment acquisition unit 50, an output value setting unit 52, a notification controller 54, and a bid block setting unit 56. Processing performed by these units can be said to be an operational support method of the present embodiment. The controller 18*b* reads software (computer program) stored in the storage unit 16 to implement the external environment acquisition unit 50, the output value setting unit 52, the notification controller 54, and the bid block setting unit 56, and these units perform the processing described below.

The external environment acquisition unit 50 acquires the external environmental condition value at the predetermined time serving as a target time for which the maximum output of the power generation facility is to be set. The external environmental condition value refers to a value representing a predicted condition of an external environment of the power generation facility 1 at the predetermined time, and more specifically, refers to a predicted value about the condition of the external environment that affects the maximum output of the power generation facility 1. The external environmental condition value is, for example, atmospheric temperature at the predetermined time. The external environmental condition value is, however, not limited to the atmospheric temperature, and may be, for example, humidity or atmospheric pressure. The external environment acquisition unit 50 may acquire the external environmental condition value at the predetermined time, for example, from an external device, or may calculate the external environmental condition value using a predetermined arithmetical operation.

The output value setting unit 52 sets a maximum output setting value at the predetermined time based on the external environmental condition value acquired by the external environment acquisition unit 50. The maximum output setting value is a maximum value of the output of the power generation facility 1 (the maximum output of the power generation facility 1) when the external environment of the power generation facility 1 is assumed to have the external environmental condition value. The maximum value of the output of the power generation facility 1 herein means the rated output (output at the base load, the rated load, or the 100% load). Therefore, the maximum output setting value refers to the rated output when the external environment of the power generation facility 1 is assumed to have the external environmental condition value. The relation between the maximum output setting value and the external environmental condition value is set in advance, and may be set, for example, based on an analysis or an experiment. The output value setting unit 52 sets the maximum output setting value related to the external environmental condition value acquired by the external environment acquisition unit 50 as the maximum output setting value in the relation between the maximum output setting value and the external environmental condition value.

Figure 16:
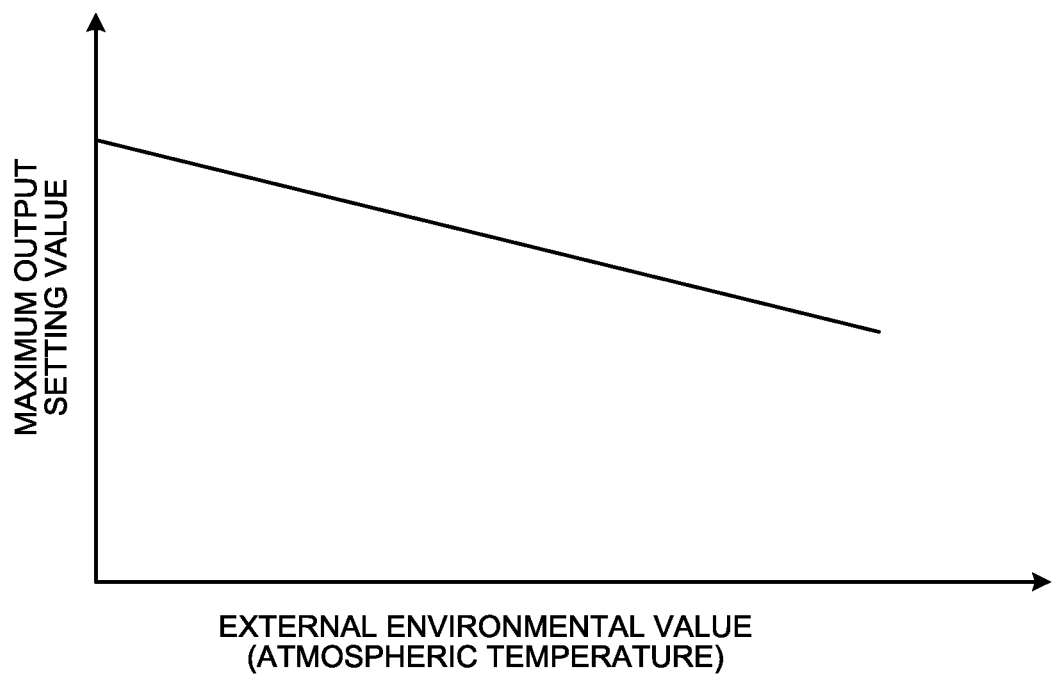
FIG. 16 is a graph illustrating an example of a relation between a maximum output setting value and an external environmental condition value.

FIG. 16 is a graph illustrating an example of the relation between the maximum output setting value and the external environmental condition value. In the example of FIG. 16, the maximum output setting value decreases with increase in the external environmental condition value (herein, the atmospheric temperature). For example, when the power generation facility 1 is the gas turbine, the maximum outputtable value, that is, the rated output decreases with increase in the atmospheric temperature. Accordingly, the relation between the maximum output setting value and the external environmental condition value can be set in advance. The relation between the maximum output setting value and the external environmental condition value in FIG. 16 is, however, merely an example, As described above, the operational support device 10b according to the third embodiment sets the output of the power generation facility 1 at the predetermined time after the current time, and includes the external environment acquisition unit 50 that acquires the external environmental condition value of the power generation facility 1 at the predetermined time and the output value setting unit 52 that sets the maximum output setting value serving as the maximum value of the output of the power generation facility 1 based on the external environmental condition value. In a case of supporting the operation of the power generation facility 1 by predicting the future output of the power generation facility 1, the operation of the power generation facility 1 may not be appropriately supportable unless the maximum output of the power generation facility 1 can be appropriately predicted. To counter this problem, the operational support device 10b according to the present embodiment sets the maximum value of the output of the power generation facility 1 based on the predicted value of the future external environment. Therefore, the maximum output of the power generation facility 1 can be accurately predicted, and the operation of the power generation facility 1 can be appropriately supported. The operational support device 10b may use the same method as the method for setting the maximum output of the power generation facility 1 based on the external environmental condition value to set (predict) other parameters of the power generation facility 1. For example, the operational support device 10b may set (predict), for example, the power generation efficiency of the power generation facility 1 at the predetermined time based on the external environmental condition value.

However, the external environmental condition value may vary with a probability distribution. In other words, the external environmental condition value is a predicted value, and therefore, may deviate from an actual value, and the maximum output setting may also have a deviated value. To prepare for that case, the operational support device 10b may set the maximum output setting as described in the following example.

In this example, the external environment acquisition unit 50 acquires a plurality of the external environmental condition values at the predetermined time. Herein, the external environmental condition values are predicted values for the same condition of the external environment, and differ in value from one another. For example, when the condition of the external environment is the atmospheric temperature, the external environmental condition values are, for example, 23° C. and 24° C. The external environment acquisition unit 50 may acquire the external environmental condition values in addition to the respective probability distributions thereof. In other words, the external environment acquisition unit 50 may acquire probabilities at which the external environmental condition values result in the predicted values so as to be associated with the external environmental condition values.

The output value setting unit 52 sets the maximum output setting value at the predetermined time based on each of the external environmental condition values. In other words, the output value setting unit 52 sets the maximum output setting value for each of the external environmental condition values. The maximum output setting value is the rated output as described above.

In this example, the controller 18b of the operational support device 10b includes a difference acquisition unit (not illustrated). The difference acquisition unit acquires a difference value between the rated output and the overfiring output serving as the maximum value of the output in the overfiring operation. The overfiring output refers to the maximum output (for example, the 110% load) when the power generation facility 1 performs the overfiring operation. The difference value between the rated output and the overfiring output may be set in advance. If the overfiring output is proportional to the rated output, the difference value may be calculated based on the rated output. In other words, in this case, the difference acquisition unit may calculate the difference value based on the maximum output setting assuming the maximum output setting set by the output value setting unit 52 as the rated output. The difference acquisition unit may calculate the difference value using, for example, the lowest of the maximum output settings for the respective external environmental condition values.

The output value setting unit 52 sets a modified maximum output setting value based on the maximum output setting values for the respective external environmental condition values. The output value setting unit 52 sets the modified maximum output setting value to a value lower than the highest of the maximum output setting values for the respective external environmental condition values. More specifically, the output value setting unit 52 preferably sets the modified maximum output setting value to a value obtained by adding the difference value acquired by the difference acquisition unit to the maximum output setting value having the lowest value among the maximum output setting values for the respective external environmental condition values.

Figure 17:
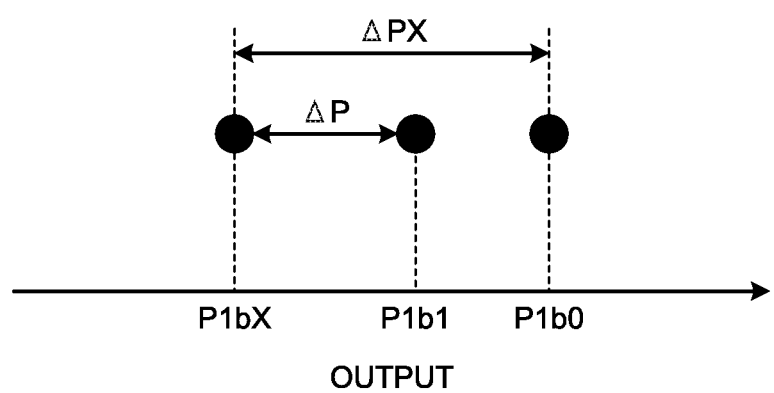
FIG. 17 is a graph illustrating an example of a modified maximum output setting value.

FIG. 17 is a graph illustrating an example of the modified maximum output setting value. For example, consider a case in FIG. 17 where the electricity is assumed to be suppliable at a rated output P1$b$0. However, for example, if an influence of the external environmental condition during the actual supply of the electricity has changed the actual rated output to a rated output P1$b$X, the rated output is below the rated output P1$b$0 by a difference output $\Delta$PX. In this case, to attain the assumed rated output P1$b$0, the difference output $\Delta$PX needs to be output as an extra output. In other words, the output temporarily needs to be higher than the rated output by an amount of the difference output $\Delta$PX. In this case, if the specification of the power generation facility 1 is not enough to output the difference output $\Delta$PX as the extra output, the rated output P1$b$0 cannot be attained, and the electricity cannot be supplied at the rated output P1$b$0. In this case, an operation plan of the power plant cannot be fulfilled, and, for example, in a deregulated electricity market, a penalty is imposed. To counter this problem, the output value setting unit 52 sets a modified maximum output setting P1$b$1 to a value obtained by adding a difference value $\Delta$P to the minimum value of the maximum output setting values predicted based on the external environmental condition. In the example of FIG. 17, for convenience of description, the minimum value of the maximum output setting values predicted based on the external environmental condition corresponds to the rated output P1$b$X. Since a case is assumed where the external environmental condition is disadvantageous to the output, the minimum value of the maximum output setting values predicted based on the external environmental condition is close to the rated output P1$b$X serving as the actual output. The difference value $\Delta$P is the difference value between the rated output and the overfiring output, that is, an output that can be covered by the overfiring output. In other words, the difference value $\Delta$P can be said to be a value that can be output as a further extra value in addition to the rated output. In this way, the output value setting unit 52 sets the modified maximum output setting P1$b$1 to the value obtained by adding the difference value $\Delta$P that can be covered by the overfiring output to the minimum output predicted based on the external environmental condition. The modified maximum output setting P1$b$1 is tendered as a maximum bid block rated value, and thereby, the setting is made including a margin provided by the overfiring operation. Thus, even when the actual output varies, the power generation facility 1 provides the overfiring output so as to enable the output at the modified maximum output setting P1$b$1.

Referring back to FIG. 15, the notification controller 54 causes the output unit 14 to make a notification to recommend to use the maximum output setting value set by the output value setting unit 52, that is, to recommend to use the maximum output setting value set by the output value setting unit 52 to support the operation of the power generation facility 1. This recommendation allows the user to support the operation of the power generation facility 1 with reference to the accurately predicted maximum output of the power generation facility 1.

In addition, the operational support device 10$b$ may set the bid block based on the maximum output setting value set based on the external environmental condition value. Thus, the bid block can be appropriately set. The bid block setting unit 56 of the operational support device 10$b$ sets the bid block at the predetermined time based on the maximum output setting value set by the output value setting unit 52. As described also in the first embodiment, the bid block is the information indicating the price of supplied electricity for each output of the power generation facility 1. Also in the present embodiment, however, the generation of the bid block is not essential.

Figure 18:
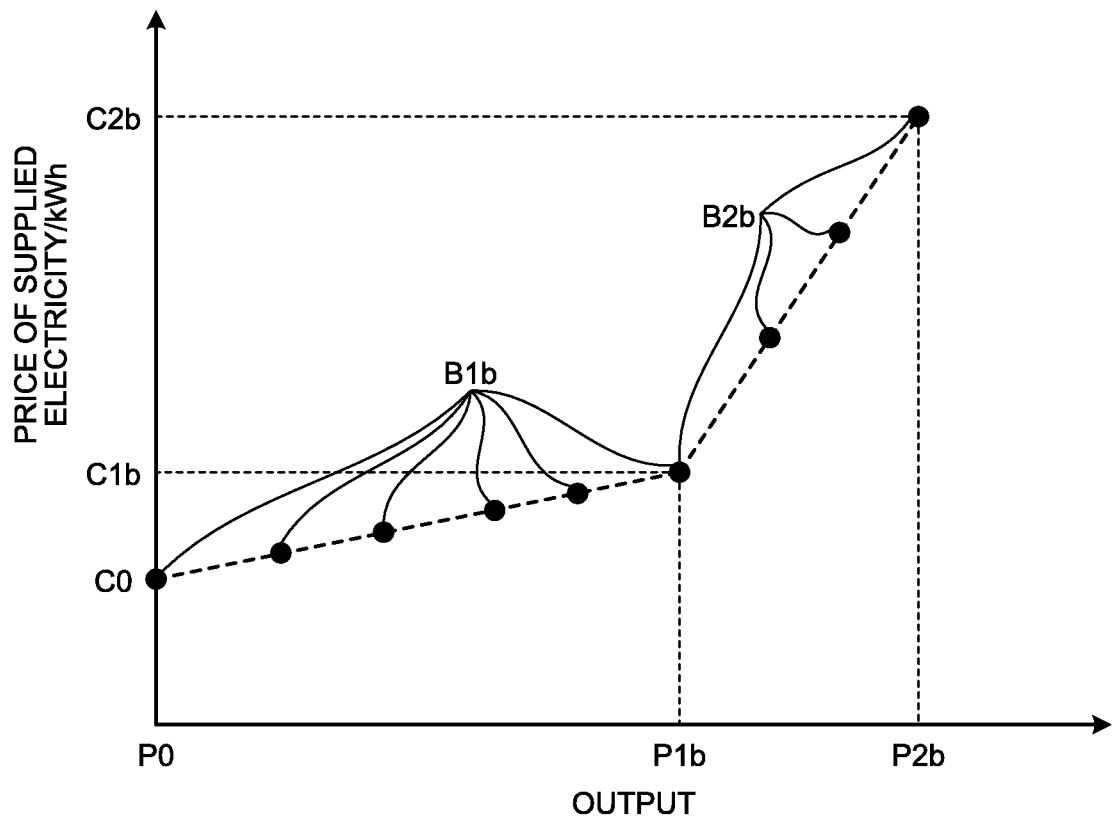
FIG. 18 is a graph illustrating an example of bid blocks according to the third embodiment.

FIG. 18 is a graph illustrating an example of the bid blocks according to the third embodiment. The bid block setting unit 56 generates the bid blocks including the rated bid blocks and the high-output bid blocks. The bid block setting unit 56 sets a maximum bid block rated value P1$b$ and generates the rated bid blocks based on the maximum output setting value set by the output value setting unit 52. The maximum bid block rated value P1$b$ refers to an output value in one of the bid blocks set as the maximum value of the output of the power generation facility 1, and in more detail, to an output value in one of the rated bid blocks set as the maximum value of the output of the power generation facility 1. In the present embodiment, the bid block setting unit 56 sets the maximum bid block rated value P1$b$ to the maximum output setting value set by the output value setting unit 52, that is, to a predicted value of the rated output based on the external environmental condition value.

The bid block setting unit 56 acquires a predicted value of the expenses required to supply the electricity at the predetermined time. The predicted value of the expenses required to supply the electricity is acquired using the same method as that used by the bid block generation unit 30 according to the first embodiment.

The bid block setting unit 56 sets the rated bid blocks based on the maximum bid block rated value P1$b$ and the predicted value of the expenses required to supply the electricity. As illustrated by data B1$b$ in FIG. 18, the bid block setting unit 56 sets the rated bid blocks such that the price of supplied electricity equals a price C0 when the output of the power generation facility 1 equals the minimum output P0, the price of supplied electricity equals a price C1$b$ when the output of the power generation facility 1 equals the maximum bid block rated value P1$b$, and the price of supplied electricity is proportional (in this case, in a first order proportional relation) to the output of the power generation facility 1. The price C1$b$ is, for example, a value obtained by multiplying the maximum bid block rated value P1$b$ by the predicted value of the expenses required to supply the electricity per unit output. However, a predetermined value may be further added to the obtained value, or the obtained value may be multiplied by a predetermined coefficient to obtain the price C1$b$. The method for setting the rated bid blocks is not limited to the above-described method, and may be any method, in which the maximum value among the outputs of the rated bid blocks only needs to be the maximum bid block rated value P1$b$ The bid block setting unit 56 generates the high-output bid blocks based on the maximum bid block rated value P1$b$. While the rated bid blocks are bid blocks in an output range from the minimum output P0 to the maximum bid block rated value P1$b$, the high-output bid blocks are bid blocks in an output range of the maximum bid block rated value P1$b$ or higher. The bid block setting unit 56 sets the price of supplied electricity to the price C1*b* (that is, the same price as that of one of the rated bid blocks) at the maximum bid block rated value P1*b*, and sets the high-output bid blocks such that the rate of change in the price of electricity with respect to the output is higher than the rate of change in the price of electricity with respect to the output for the rated bid blocks. That is, as illustrated by a line segment connecting together data B2*b* in FIG. 17, the gradient of the price of electricity with respect to the output of the high-output bid blocks is larger than the gradient of the price of electricity with respect to the output of the lower-output bid blocks illustrated by a line segment connecting together the data B1*b*. As illustrated in FIG. 18, the maximum bid block rated value P1*b* can be said to be located at a gradient changing point where the rate of change in the price of supplied electricity with respect to the output of the power generation facility 1 changes. In the example of FIG. 18, the price of one of the high-output bid blocks at a maximum output value P2*b* equals a price C2*b*.

The bid block setting unit 56 generates the bid block at the predetermined time as described above. Although the bid block setting unit 56 generates the bid blocks for the day-ahead market, the bid block setting unit 56 may generate the bid block for another electricity market, such as the intra-day market or the real-time market. In this case, the external environment acquisition unit 50 acquires a predicted value of the external environmental condition value at the predetermined time nearest to a deadline for the target electricity market, and the bid block setting unit 56 generates the bid block using the maximum output setting value based on the external environmental condition value at the nearest time. Alternatively, the external environment acquisition unit 50 may generate the bid blocks for a plurality of markets so as to be comparable with one another.

If a predicted value of the price of supplied electricity at the predetermined time is equal to or higher than a predetermined price, the notification controller 54 illustrated in FIG. 15 may cause the output unit 14 to make a notification to recommend to employ the bid block generated by the bid block setting unit 56. In other words, the notification controller 54 acquires the price of supplied electricity at the predetermined time based on the bid block generated by the bid block setting unit 56, and determines whether the price of supplied electricity is higher than the predetermined price set in advance. If the price of supplied electricity at the predetermined time is higher than the predetermined price, the notification controller 54 causes the output unit 14 to output the notification to recommend to employ the bid block generated by the bid block setting unit 56. By causing the output unit 14 to make the notification in this way, the opportunity to increase the price to increase the revenue can be recognized by the user. The operational support device 10*b* may include the life index value acquisition unit 22 described in the first embodiment. The notification controller 54 may cause the output unit 14 to output the notification to recommend to employ the bid block generated by the bid block setting unit 56 if the life index value acquired by the life index value acquisition unit 22 is equal to or higher than the predetermined value. That is, when the life index value is equal to or higher than the predetermined value, the remaining life is sufficient, and performing the overfiring output can be afforded. In such a case, making the notification to recommend to employ the bid block allows the user to recognize the opportunity to increase the revenue while restraining troubles from occurring in the power generation facility 1.

Figure 19:
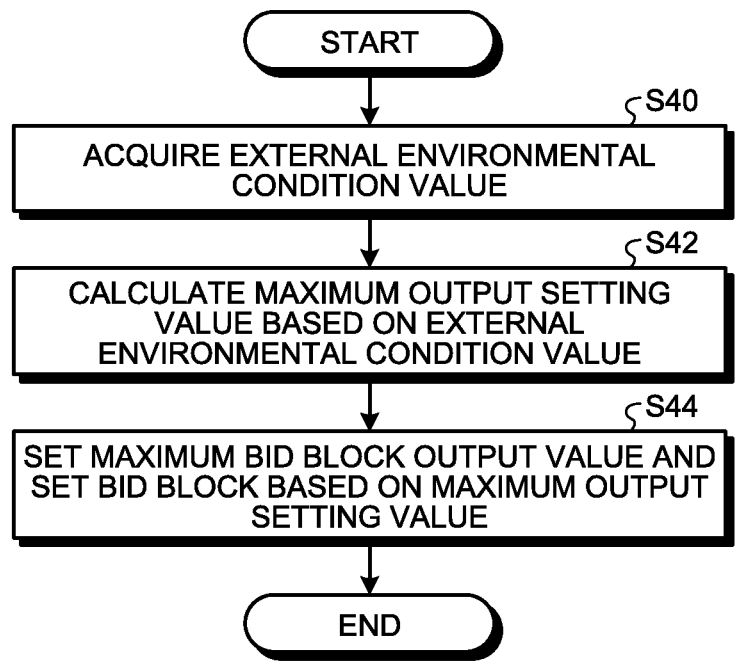
FIG. 19 is a flowchart for explaining a processing flow according to the third embodiment.

The operational support device 10*b* sets the maximum output setting and generates the bid block, as described above. The following describes a processing flow of the operational support device 10*b* according to the present embodiment, based on a flowchart. FIG. 19 is the flowchart for explaining the processing flow according to the third embodiment. As illustrated in FIG. 19, the operational support device 10*b* causes the external environment acquisition unit 50 to acquire the external environmental condition value at the predetermined time (Step S40), and causes the output value setting unit 52 to calculate the maximum output setting value based on the external environmental condition value (Step S42). The operational support device 10*b* causes the bid block setting unit 56 to set the maximum bid block rated value P1*b* and generates the bid block based on the maximum output setting value (Step S44).

As describe above, the operational support device 10*b* according to the present embodiment sets the maximum value of the output of the power generation facility 1 based on the predicted value of the future external environment. Therefore, the maximum output of the power generation facility 1 can be accurately predicted, and the operation of the power generation facility 1 can be appropriately supported.

Herein, the bid block indicates the price when the power generation facility 1 supplies the electricity. Therefore, the bid block affects the revenue of the power generation facility 1. For example, a price too high fails to find a buyer, and a price too low reduces the revenue even if a buyer is found. In addition, for example, when a buyer for an output higher the rated output is found, the output higher than the rated output needs to be produced, so that the life may be reduced by the overfiring, or required electricity may fail to be supplied due to an insufficient output, leading to imposition of a penalty. Moreover, a deadline for submission of a bid block is set before the target time. Therefore, the bid block needs to be set before the target time, thus the bid block is difficult to be appropriately set. Accordingly, to support the appropriate operation of the power generation facility 1 by appropriately ensuring the revenue of the power generation facility 1, the bid block is required to be appropriately set.

To counter this problem, the operational support device 10*b* according to the present embodiment sets the maximum bid block rated value P1*b* based on the maximum output setting value set based on the external environmental condition value. Accordingly, the maximum bid block rated value P1*b* is restrained from deviating from the rated output at the time of actually supplying the electricity so as to be capable of appropriately generating the bid block. In a market in a deregulated electricity area where the bid block is employed, the revenue of the power generation facility 1 can be appropriately ensured by generating the bid block using the maximum output value taking into account the external environmental condition value.

Figure 20:
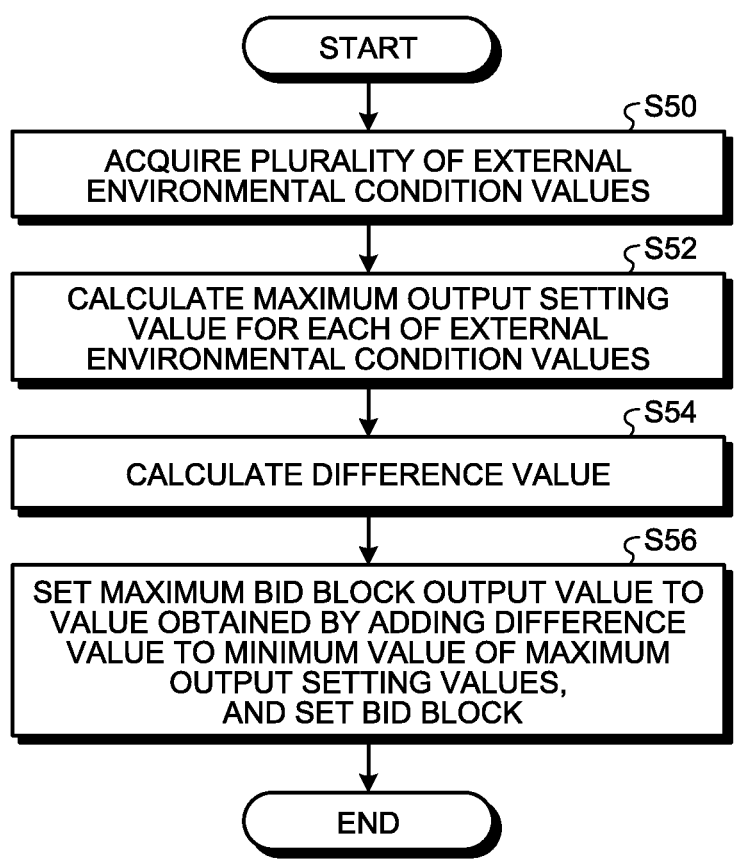
FIG. 20 is a flowchart for explaining a processing flow according to another example of the third embodiment.

The maximum output settings prepared for a case where the external environmental condition value is mispredicted may be used to generate the bid block. FIG. 20 is a flowchart for explaining a processing flow according to another example of the third embodiment. In this case, as illustrated in FIG. 20, the operational support device 10*b* causes the external environment acquisition unit 50 to acquire the external environmental condition values at the predetermined time (Step S50), causes the output value setting unit 52 to calculate the maximum output setting value for each of the external environmental condition values (Step S52), and causes the difference acquisition unit to acquire the difference value between the rated output and the overfiring output (Step S54). The operational support device 10b causes the bid block setting unit 56 to set the maximum bid block rated value P1b to a value obtained by adding the difference value to the minimum value of the maximum output setting values, and generates the bid block (Step S56). In other words, the bid block setting unit 56 sets the maximum bid block rated value P1b to the modified maximum output setting value (the value obtained by adding the difference value to the minimum value of the maximum output setting values), and uses the same method as that described above to generate the bid block. The bid block setting unit 56 generates the bid block in this way so as to be capable of generating the bid block usable even when the actual output varies.

As described above, the operational support device 10b according to the third embodiment sets the bid block indicating the price for each output of the electricity supplied by the power generation facility 1 at the predetermined time after the current time, and includes the external environment acquisition unit 50, the output value setting unit 52, and the bid block setting unit 56. The external environment acquisition unit 50 acquires the external environmental condition value representing the predicted condition of the external environment of the power generation facility 1 at the predetermined time. The output value setting unit 52 sets the maximum output setting value serving as the maximum value of the output of the power generation facility 1 based on the external environmental condition value. The bid block setting unit 56 sets the maximum bid block rated value P1b (the maximum value of the output of the power generation facility 1 for the bid block) based on the maximum output setting value so as to set the bid block at the predetermined time.

The operational support device 10b according to the present embodiment sets the maximum bid block rated value P1b based on the maximum output setting value set based on the external environmental condition value. Accordingly, the operational support device 10b restrains the maximum bid block rated value P1b from deviating from the rated output, and appropriately generates the bid block so as to be capable of supporting the appropriate operation of the power generation facility.

The external environment acquisition unit 50 acquires the external environmental condition values that vary with a probability distribution. The output value setting unit 52 sets the maximum value of the output of the power generation facility 1 to the value lower than the highest of the maximum output setting values calculated based on the respective external environmental condition values. The operational support device 10b sets the maximum value of the output of the power generation facility 1 as a value lower than the maximum value among the maximum output setting values calculated based on the external environmental condition values. Accordingly, even if, for example, the external environmental condition value, that is, the predicted value deviates from the actual value so as to deviate the maximum output setting value from the rated output, the output can be compensated by, for example, the overfiring, and the appropriate operation of the power generation facility can be supported.

The power generation facility 1 can perform the overfiring operation serving as the operation at an output higher than the rated output, and the operational support device 10b further includes the difference value acquisition unit that acquires the difference value between the rated output and the overfiring output. The external environment acquisition unit 50 acquires the external environmental condition values that vary with a probability distribution, and the output value setting unit 52 calculates the rated outputs for the respective external environmental condition values as the maximum output setting values. The output value setting unit 52 sets the maximum value of the output (modified maximum output setting value) of the power generation facility 1 to the value obtained by adding the difference value to the maximum output setting value having the lowest value among the maximum output setting values for the respective external environmental condition values. The operational support device 10b sets the modified maximum output setting value as an output attainable by the overfiring. As a result, the output at the modified maximum output setting value can be made even if, for example, the external environmental condition value, that is, the predicted value deviates from the actual value. Accordingly, the operational support device 10b can support the appropriate operation of the power generation facility.

The operational support device 10b further includes the life index value acquisition unit 22 and the notification controller 54. The notification controller 54 causes the notification to be made to recommend to employ the maximum output setting value set by the output value setting unit 52 if the life index value at the predetermined time is equal to or higher than the predetermined value. If the life index value is equal to or higher than the predetermined value, that is, if the remaining life is sufficient, the operational support device 10b prompts the employment of the maximum output setting value, and thus, can appropriately provide the opportunity to obtain the revenue to the user while restraining troubles from occurring in the power generation facility 1.

If the predicted value of the price of electricity at the predetermined time is equal to or higher than the predetermined price, the notification controller 54 causes the notification to be made to recommend to employ the maximum output setting value set by the output value setting unit 52. The operational support device 10b prompts the employment of the maximum output setting value when the price of electricity is predicted to be higher, and thus, can cause the user to recognize the opportunity to increase the price to increase the revenue.

The external environmental condition value is at least one of the atmospheric temperature, the humidity, and the atmospheric pressure. The operational support device 10b can accurately generate the bid block by using such a parameter or parameters as the external environmental condition value.

While the embodiments of the present invention have been described above, the embodiments are not limited to the content of the embodiments described above. The components described above include those easily conceivable by those skilled in the art, those that are substantially the same, and those in the scope of what are called equivalents. In addition, the components described above can be combined as appropriate. Furthermore, the components can be variously omitted, replaced, or modified within the scope not deviating from the gist of the embodiments described above.

REFERENCE SIGNS LIST

1 Power generation facility
10, 10a, 10b Operational support device
20 Time information acquisition unit
22, 42 Life index value acquisition unit
24, 44 Degree-of-contribution acquisition unit
26, 46 Output pattern setting unit
28 Overfiring setting unit
40 Candidate stop time setting unit 48 Stop time setting unit
50 External environment acquisition unit
52 Output value setting unit
54 Notification controller
56 Bid block setting unit

The invention claimed is:

1. An operational support device for a power generation facility to set an execution time of overfiring serving as an operation of the power generation facility at an output higher than a rated output, the operational support device comprising:
 a controller comprising a central processing unit; and
 a storage unit comprising a memory configured to store a calculation of the controller and information on computer programs, the storage unit including an external storage device,
 wherein the controller is configured to read software stored in the storage unit to:
  acquire either a life index value at a start time serving as a predetermined time after a current time and a life consumption value representing an amount of change in the life index value per unit time, or the life index value at the start time and a relation between the life consumption value and an output of the power generation facility, the life index value being an index indicating a life of the power generation facility and changing in value in one direction with the output of the power generation facility;
  a set, based on either the life index value at the start time and life consumption value or the life index value at the start time and the relation, an output pattern per unit time of the power generation facility from the start time to a stop time after the start time such that the life index value reaches a predetermined value set in advance at the stop time, while allowing the overfiring; and
  set, based on the output pattern, a time in a period from the start time to the stop time at which the overfiring is to be performed.

2. The operational support device for a power generation facility according to claim 1, wherein the controller is further configured to read software stored in the storage unit to acquire a degree of contribution to a stable supply of electricity assigned to an amount of electricity supply per unit time in each unit time during the period from the start time to the stop time, and
 set, based on the life index value at the start time and the degree of contribution during the period from the start time to the stop time, the output pattern per unit time of the power generation facility during the period from the start time to the stop time such that the life index value reaches the predetermined value set in advance at the stop time, and an evaluation value based on the degree of contribution and the amount of electricity supply per unit time during the period from the start time to the stop time is maximized.

3. The operational support device for a power generation facility according to claim 2, wherein the controller is further configured to read software stored in the storage unit to:
 acquire a price of electricity set per unit time as the degree of contribution, and
 treat a revenue obtained by power generation of the power generation facility as the evaluation value.

4. The operational support device for a power generation facility according to claim 2, wherein the controller is further configured to read software stored in the storage unit to set the output pattern so as to increase the output of the power generation facility at a time when the degree of contribution is higher.

5. The operational support device for a power generation facility according to claim 1, wherein the controller is further configured to read software stored in the storage unit to generate, based on the output pattern, bid blocks each indicating a price for each output per unit time of electricity supplied by the power generation facility.

6. The operational support device for a power generation facility according to claim 5, wherein the controller is further configured to read software stored in the storage unit to:
 generate, based on an output efficiency of the power generation facility, rated bid blocks each indicating the price for each output of the supplied electricity up to the rated output; and
 generate, based on the output of the power generation facility set by the output pattern, high-output bid blocks each indicating the price for each output of the supplied electricity when the overfiring is performed.

7. The operational support device for a power generation facility according to claim 1, wherein the external storage device is one of a random access memory, a read-only memory, and a hard disk drive.

8. An operational support device for a power generation facility to set a stop time to stop operating the power generation facility, the operational support device comprising:
 a controller comprising a central processing unit; and
 a storage unit comprising a memory configured to store a calculation of the controller and information on computer programs, the storage unit including an external storage device,
 wherein the controller is configured to read software stored in the storage unit to:
  set a candidate stop time serving as a candidate for the stop time;
  acquire a value of a life index value at a start time serving as a predetermined time after a current time, the life index value being an index indicating a life of the power generation facility and changing in value in one direction with the output of the power generation facility;
  a acquire a degree of contribution to a stable supply of electricity assigned to an amount of electricity supply per unit time in each unit time during a period from the start time to the candidate stop time;
  set, based on the life index value at the start time and the degree of contribution during the period from the start time to the candidate stop time, an output pattern per unit time of the power generation facility during the period from the start time to the candidate stop time such that the life index value reaches a predetermined value set in advance at the candidate stop time, and an evaluation value based on the degree of contribution and the amount of electricity supply per unit time during the period from the start time to the candidate stop time is maximized; and
  a set the stop time based on the output pattern.

9. The operational support device for a power generation facility according to claim 8, wherein the controller is further configured to read software stored in the storage unit to:
 set a plurality of the candidate stop times,
 set the output pattern with respect to each of the candidate stop times, and set the stop time from among the candidate stop times based on the output patterns with respect to the respective candidate stop times.

10. The operational support device for a power generation facility according to claim 9, wherein the controller is further configured to read software stored in the storage unit to compare revenues that are not obtained because the power generation facility is stopped at the respective candidate stop times and revenues obtained by operating the power generation facility from the start time to the respective candidate stop times among the candidate stop times, and set the stop time from among the candidate stop times based on the results of the comparison.

11. The operational support device for a power generation facility according to claim 8, wherein the controller is further configured to read software stored in the storage unit to:
   set the output pattern with respect to a first candidate stop time serving as one of the candidate stop times, and
   set, based on the output pattern with respect to the first candidate stop time, the stop time from among the first candidate stop time and a second candidate stop time serving as a candidate for the stop time other than the first candidate stop time.

12. The operational support device for a power generation facility according to claim 11, wherein the controller is further configured to read software stored in the storage unit to:
   compare a revenue that is not obtained because the power generation facility is stopped at the first candidate stop time, a revenue obtained by operating the power generation facility from the start time to the first candidate stop time, and the life index value at the first candidate stop time, with a revenue that is not obtained because the power generation facility is stopped at the second candidate stop time, a revenue obtained by operating the power generation facility from the start time to the second candidate stop time, and the life index value at the second candidate stop time, respectively; and
   set the stop time from among the first candidate stop time and the second candidate stop time based on the results of the comparison.

13. The operational support device for a power generation facility according to claim 8, wherein the controller is further configured to read software stored in the storage unit to set the output pattern such that overfiring serving as an operation of the power generation facility at an output higher than a rated output is performed during a period from the start time to the candidate stop time.

14. The operational support device for a power generation facility according to claim 8, wherein the external storage device is one of a random access memory, a read-only memory, and a hard disk drive.

* * * * *